Feb. 19, 1946.  E. G. STAUDE ET AL  2,395,352
BOX MAKING MACHINE
Filed June 23, 1941  15 Sheets-Sheet 1
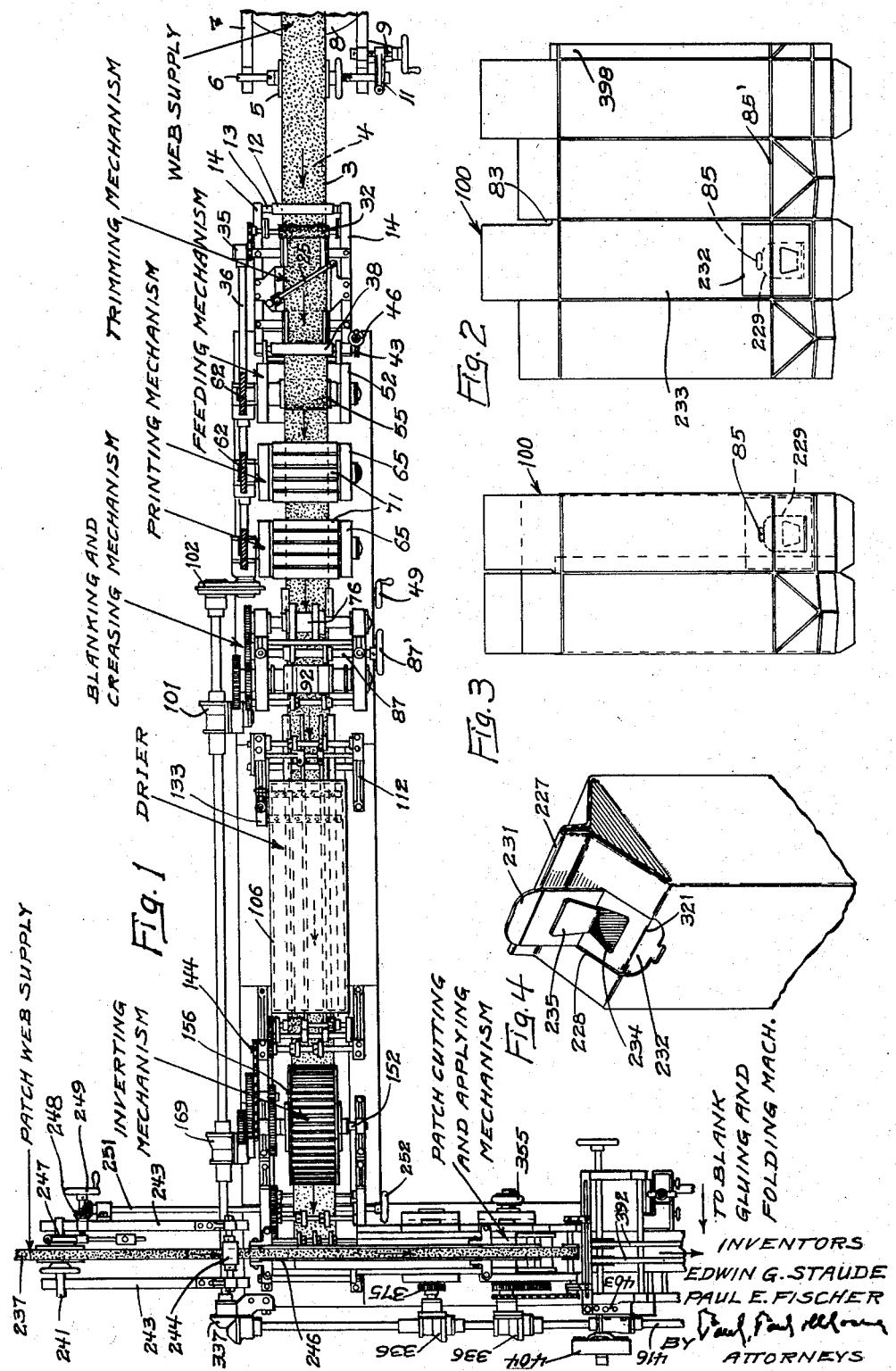
INVENTORS
EDWIN G. STAUDE
PAUL E. FISCHER
ATTORNEYS

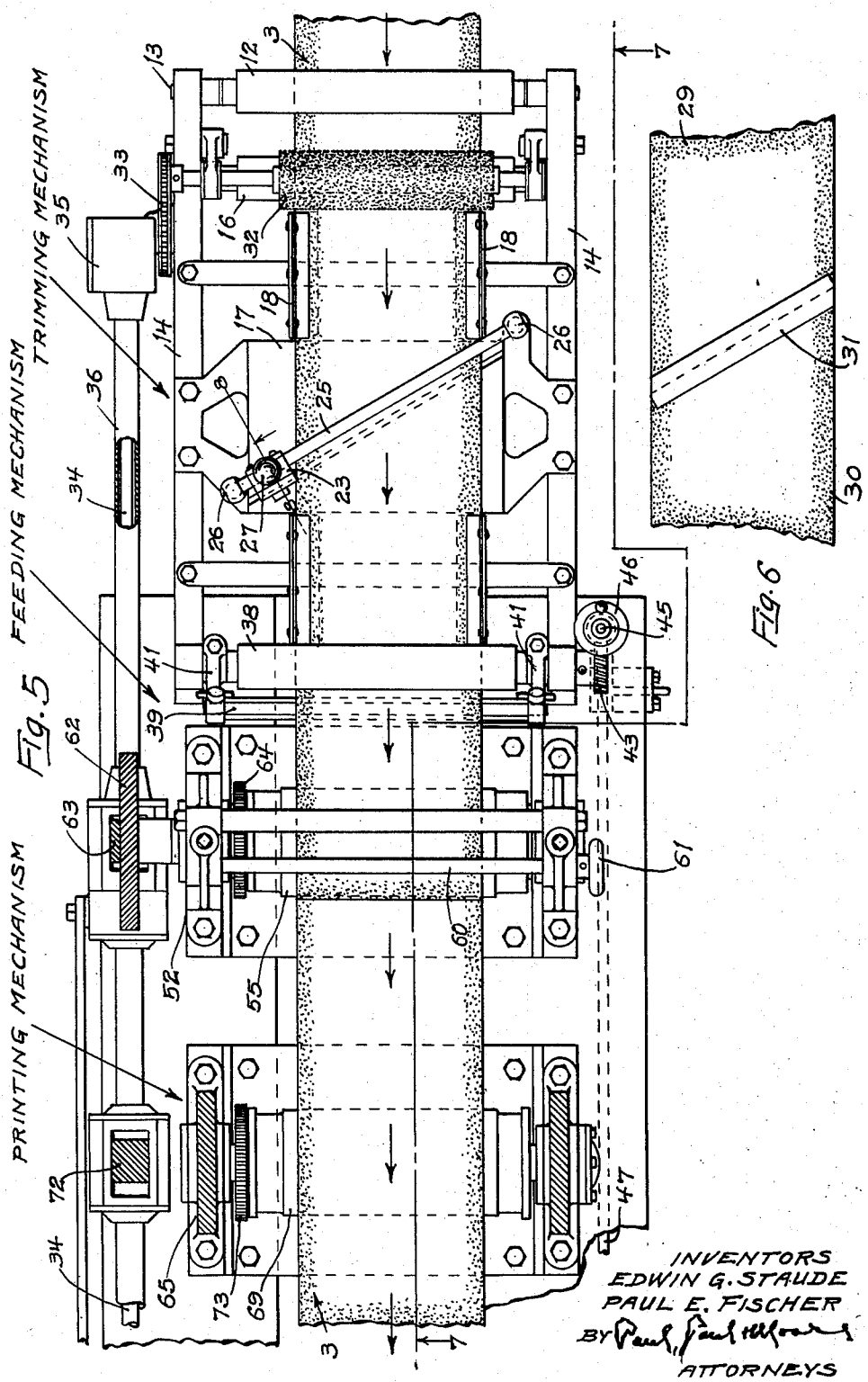

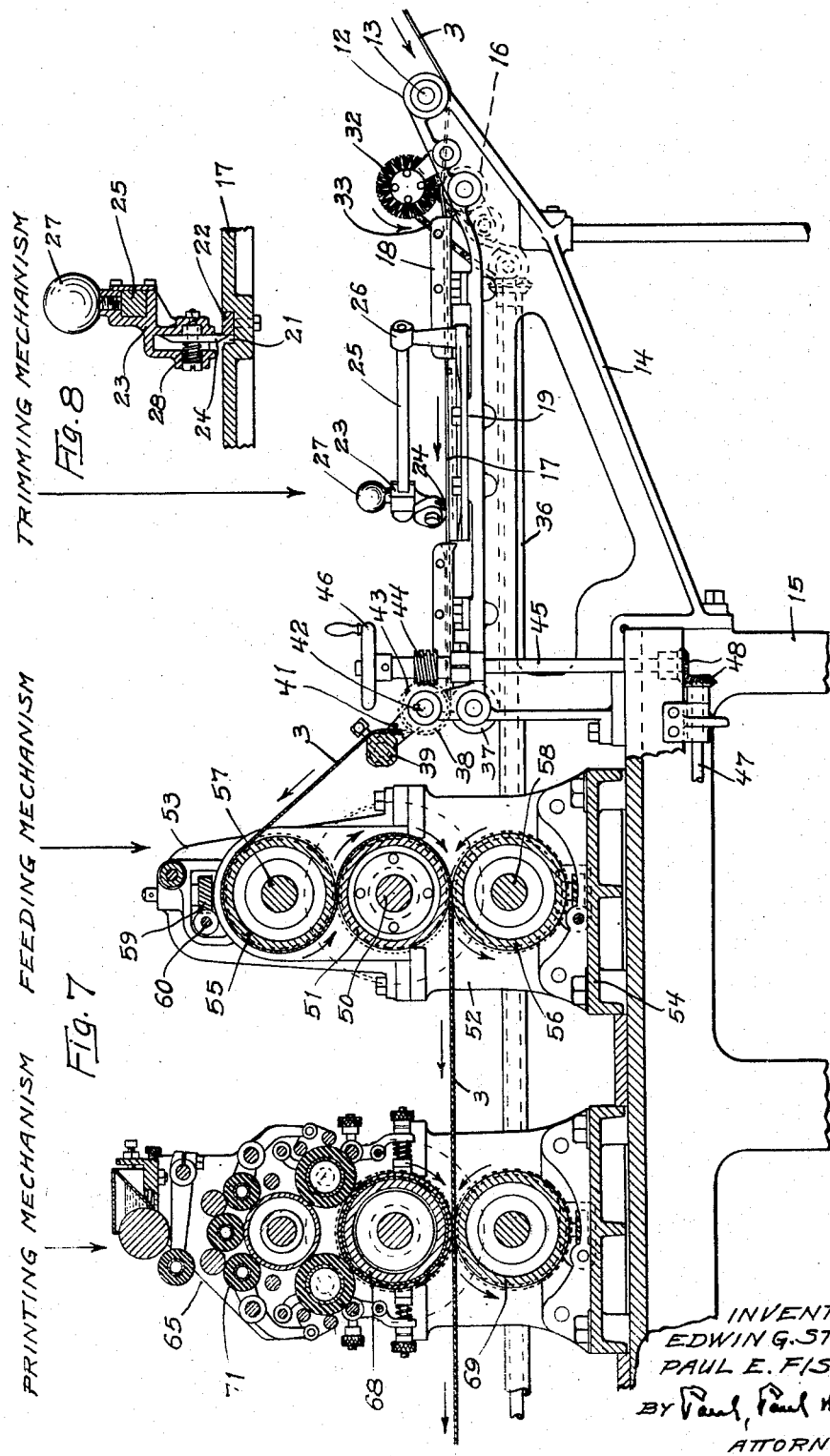

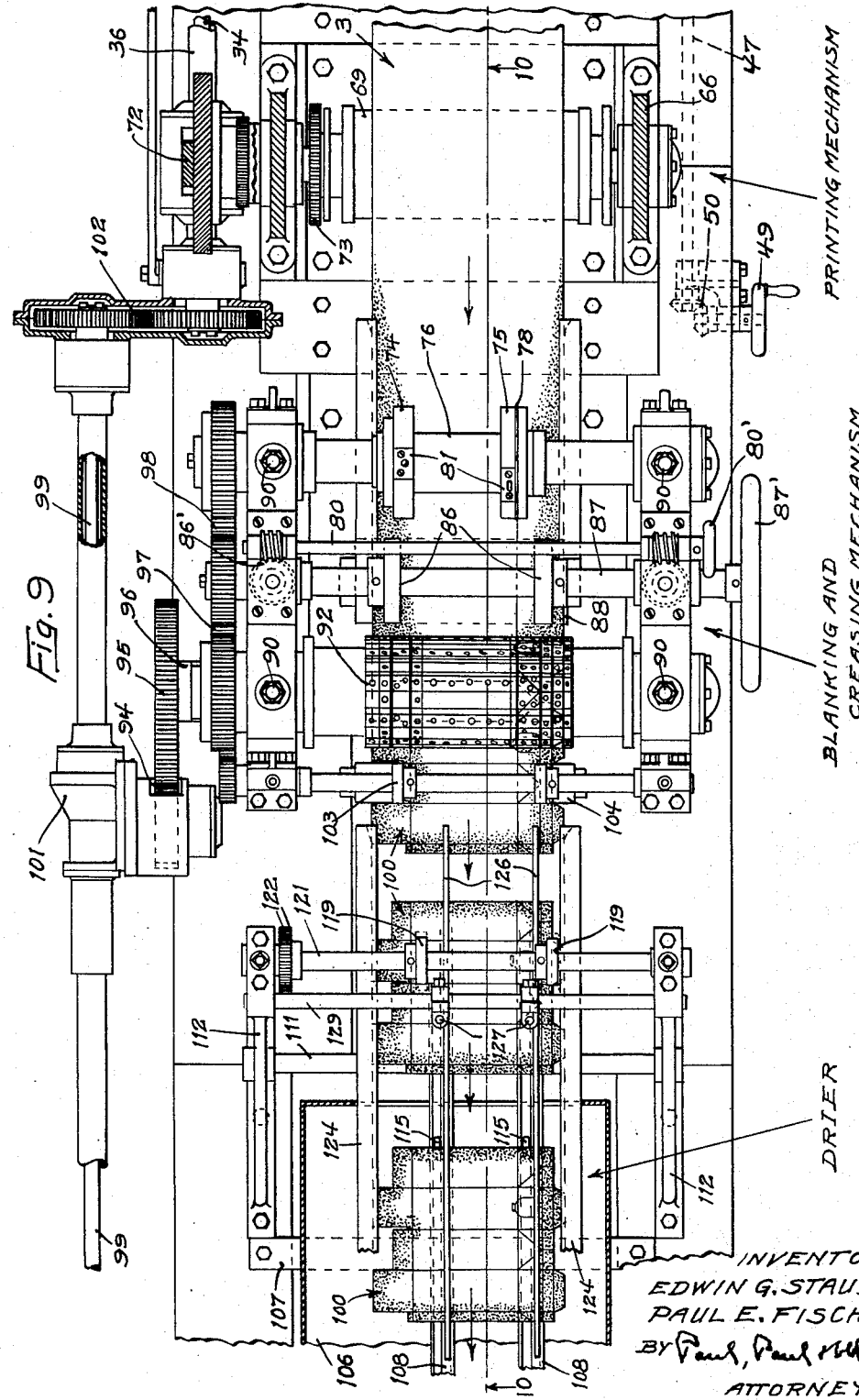

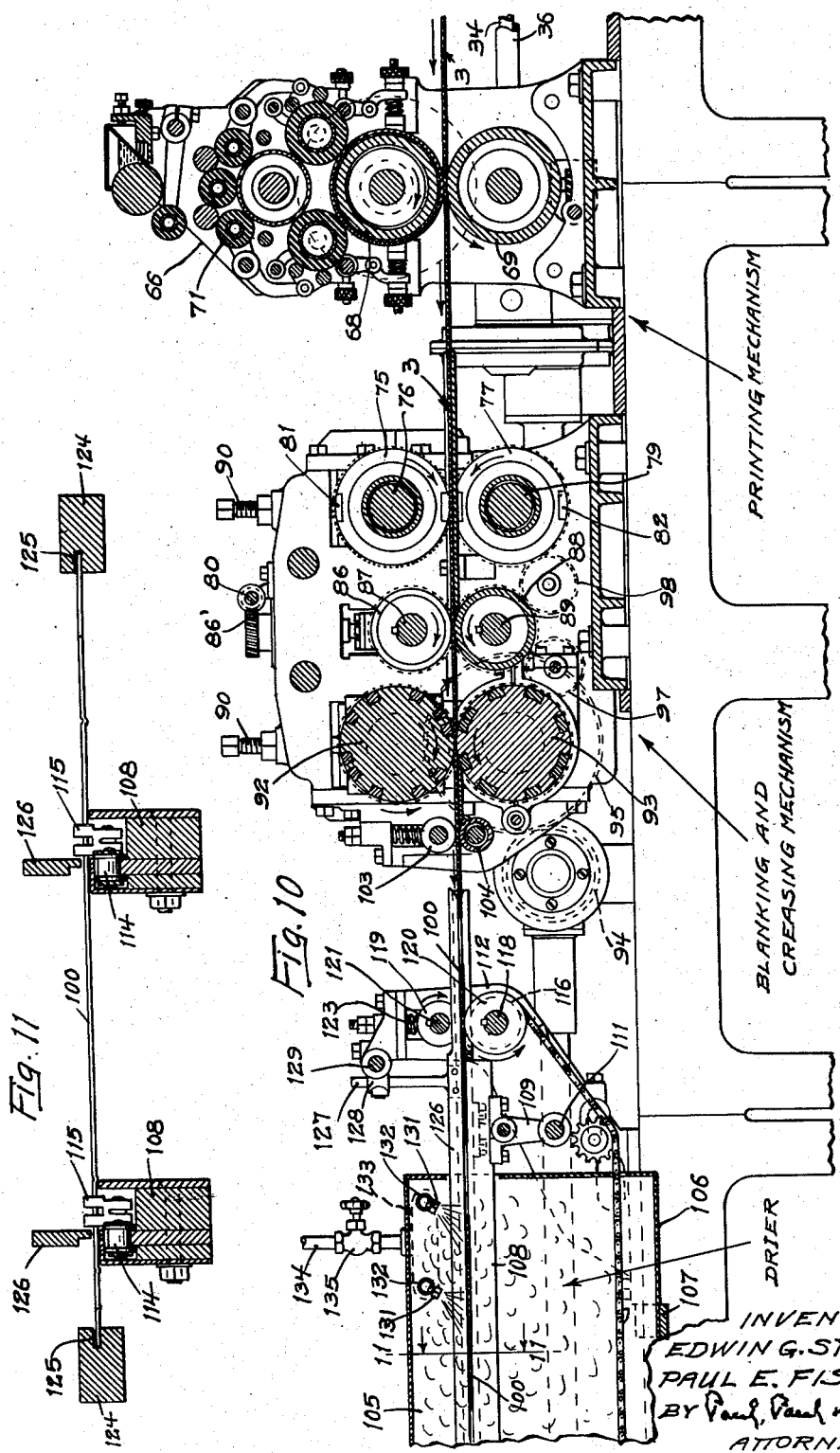

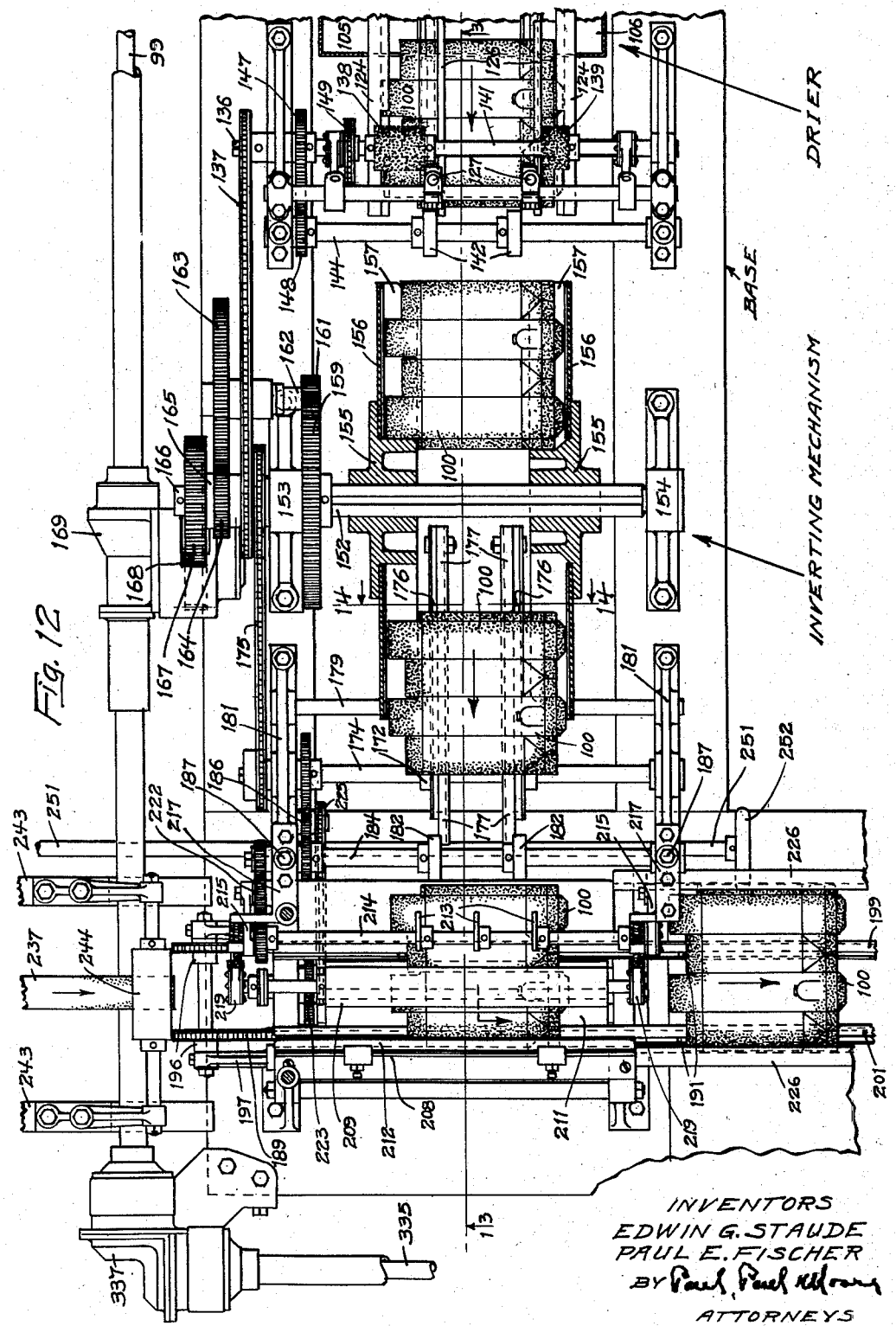

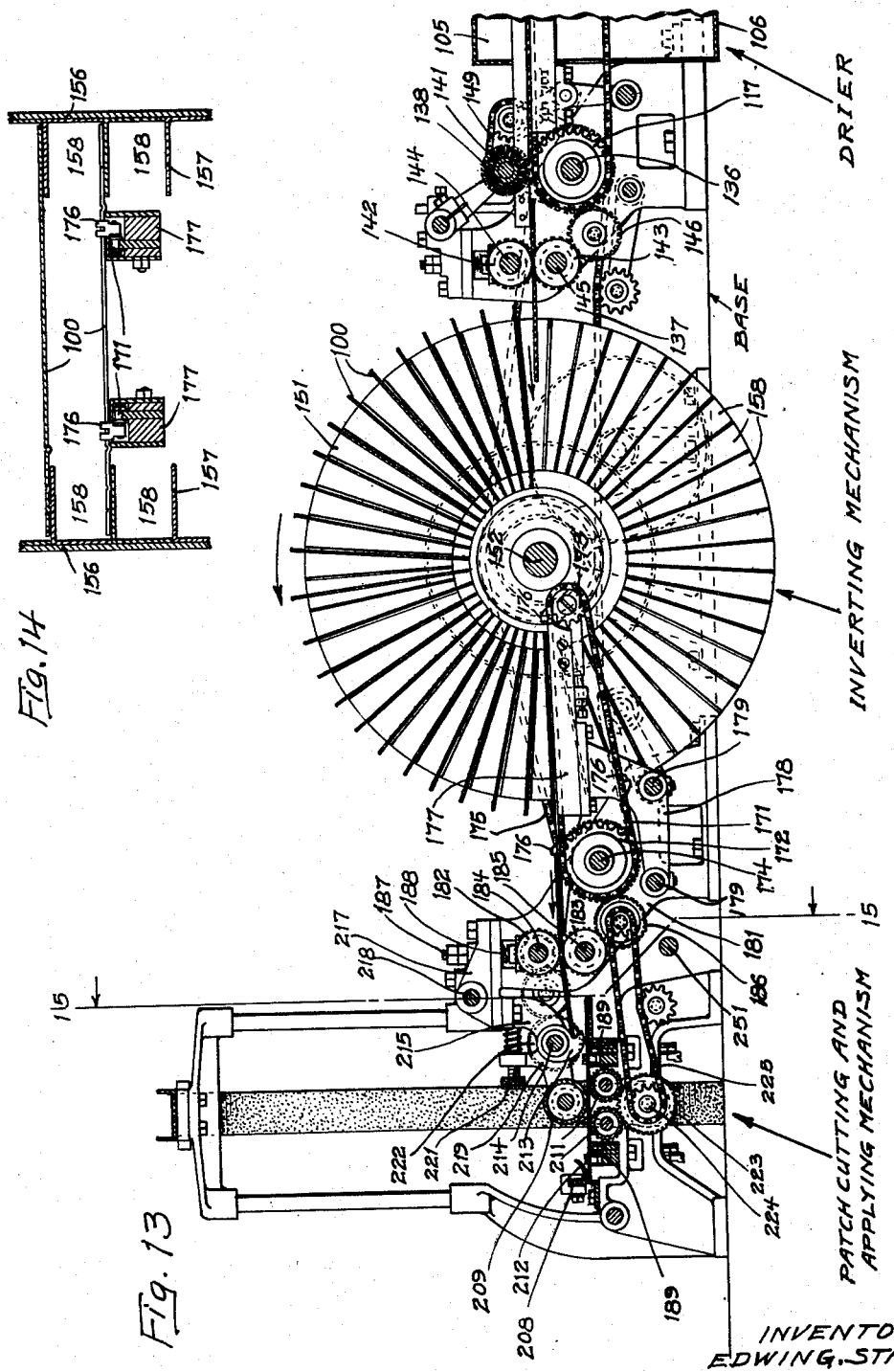

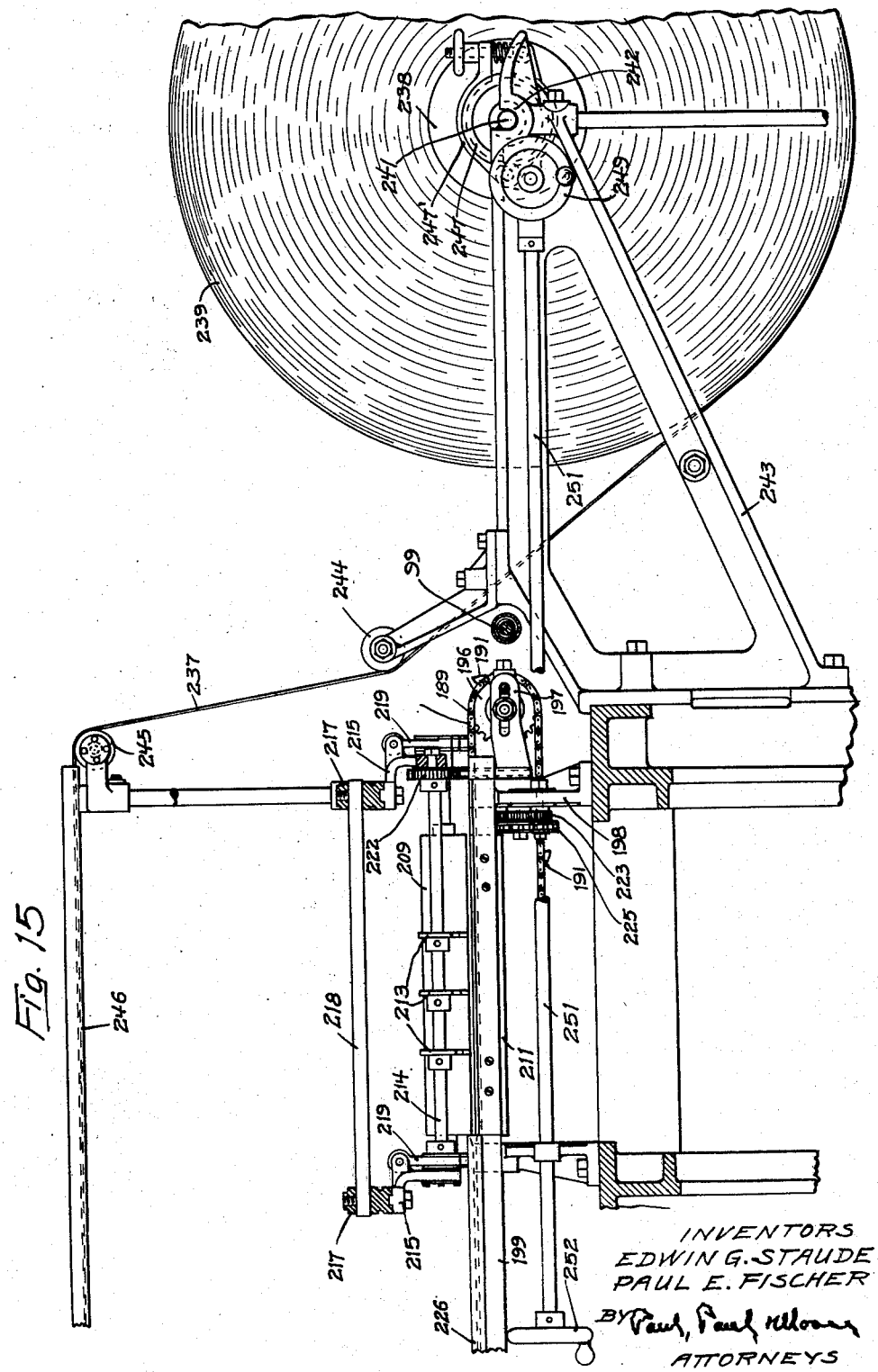

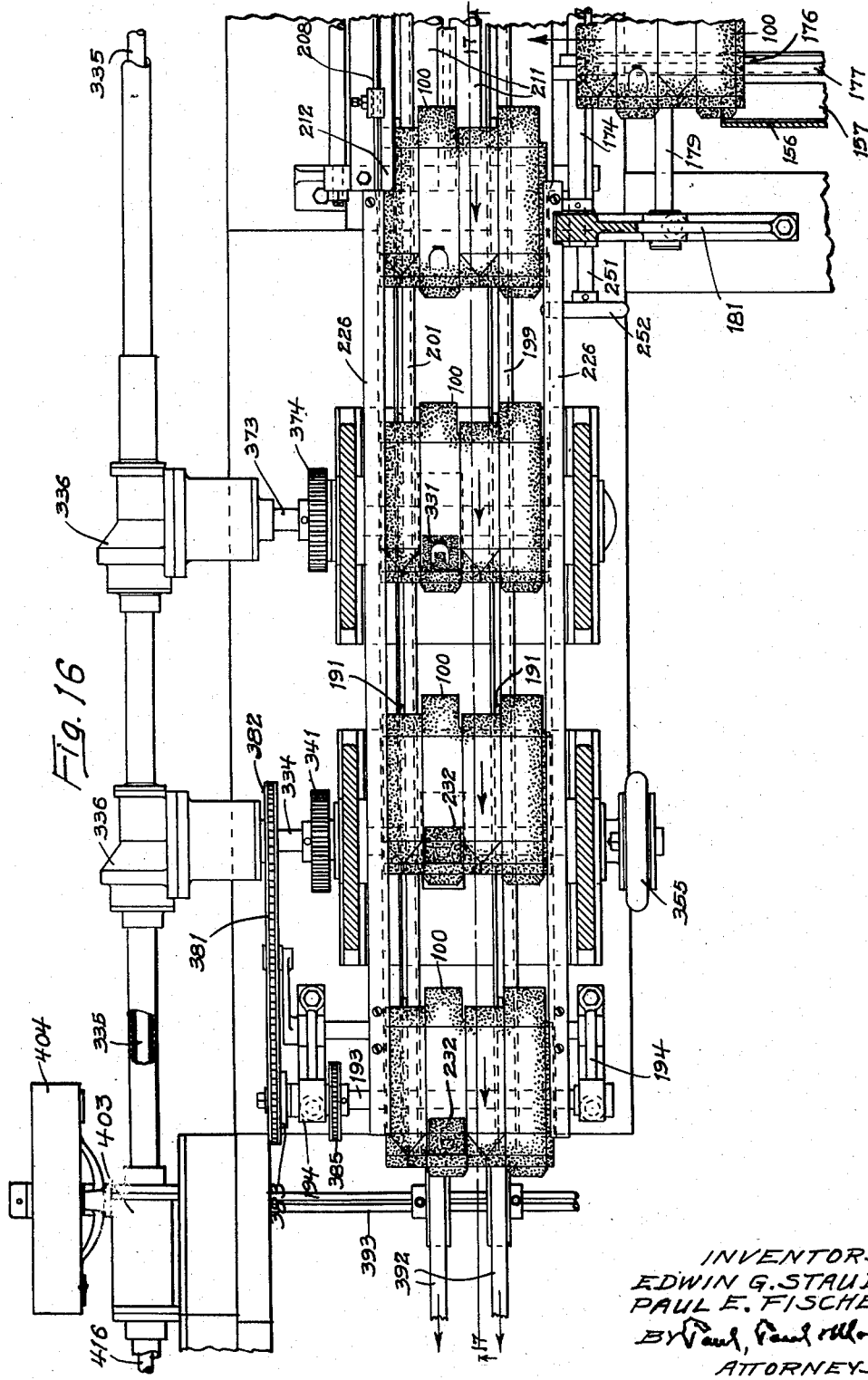

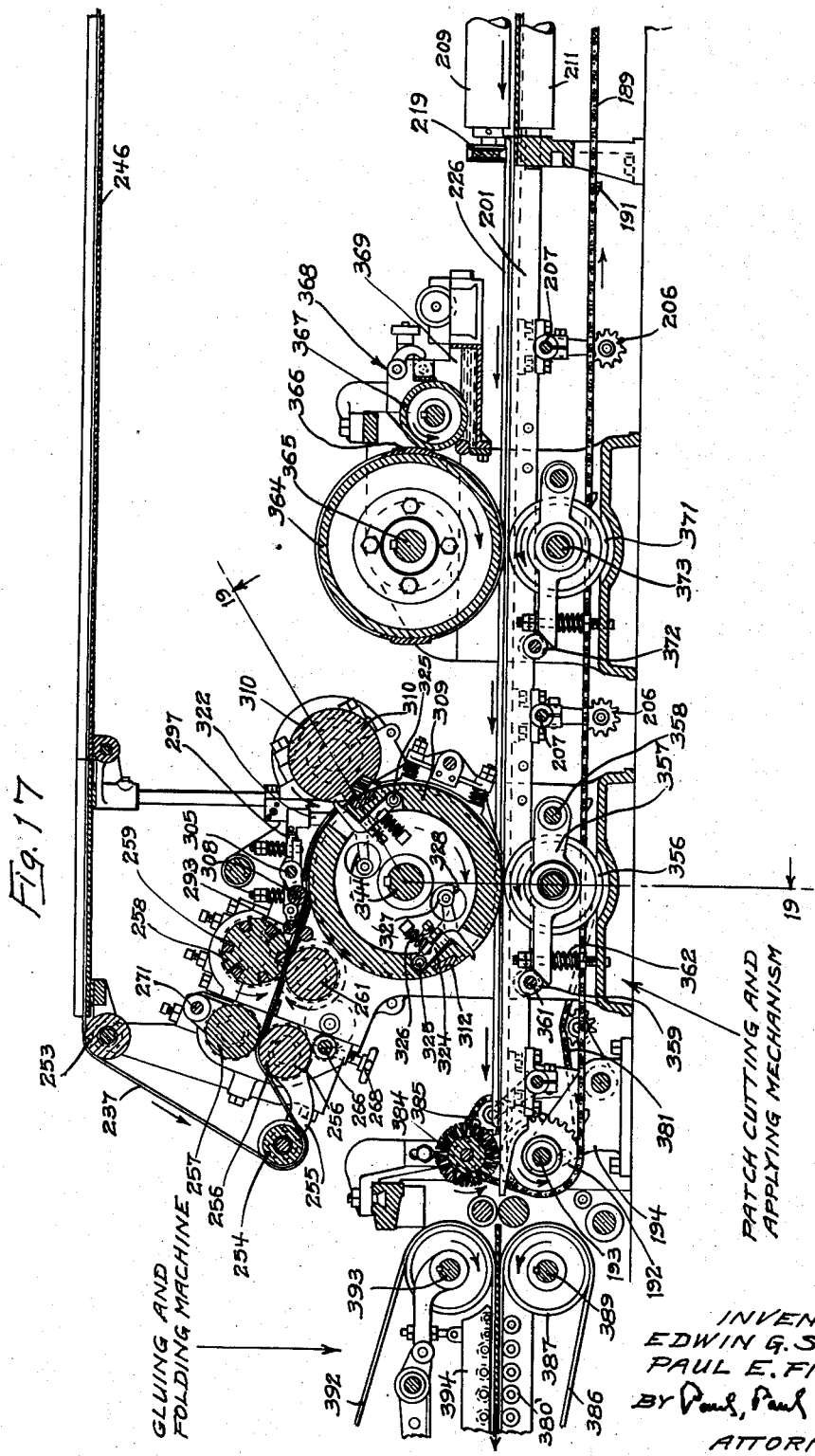

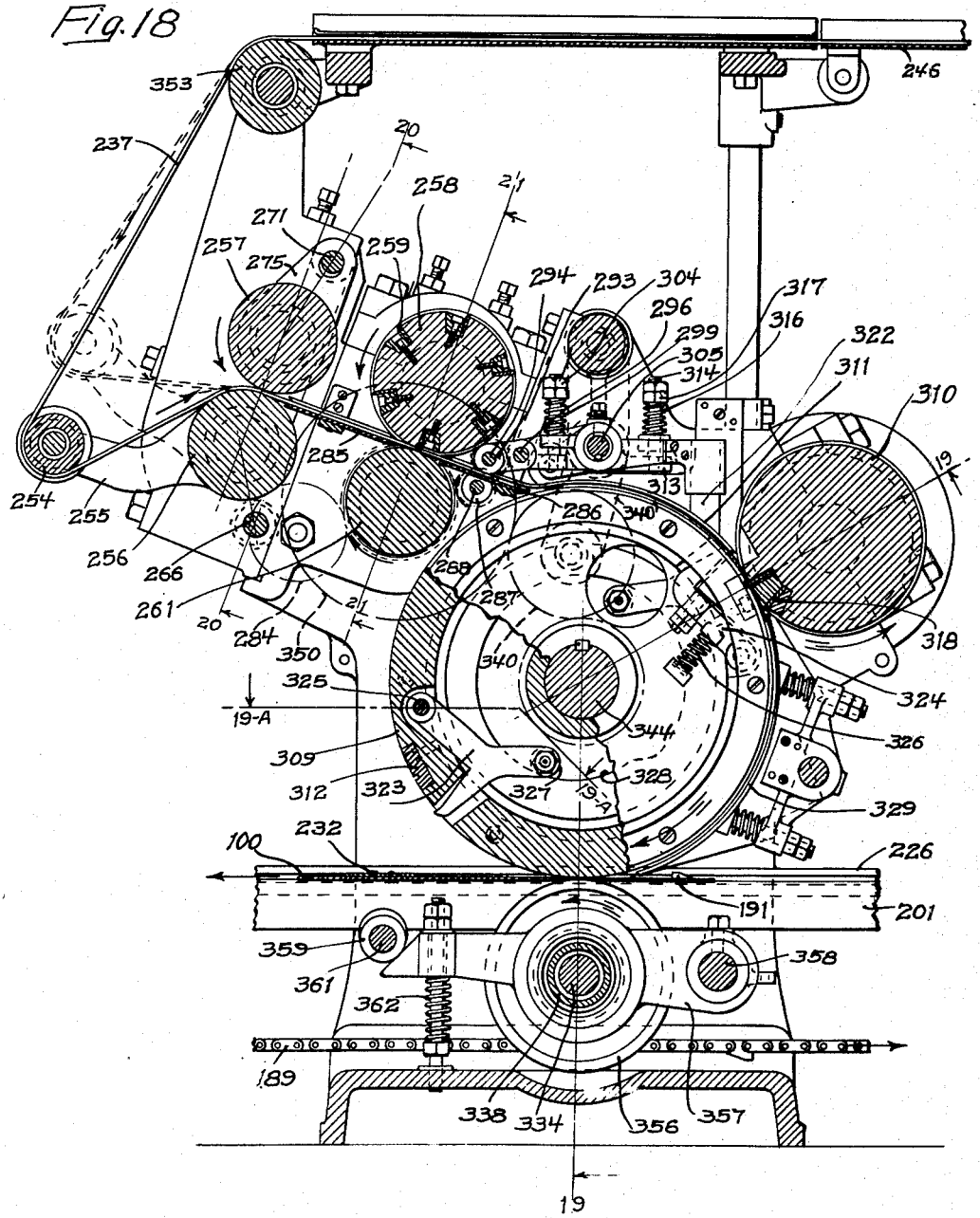

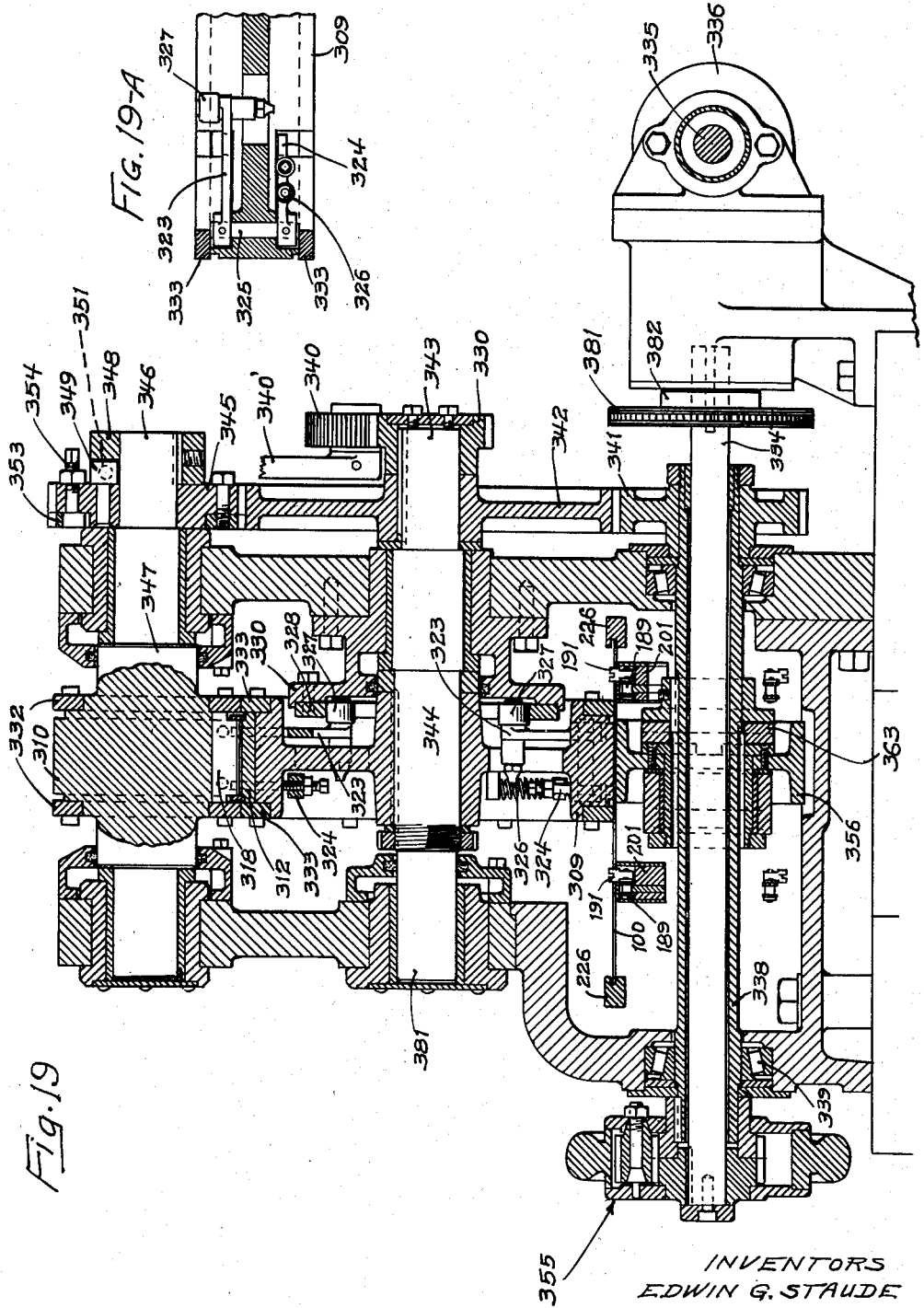

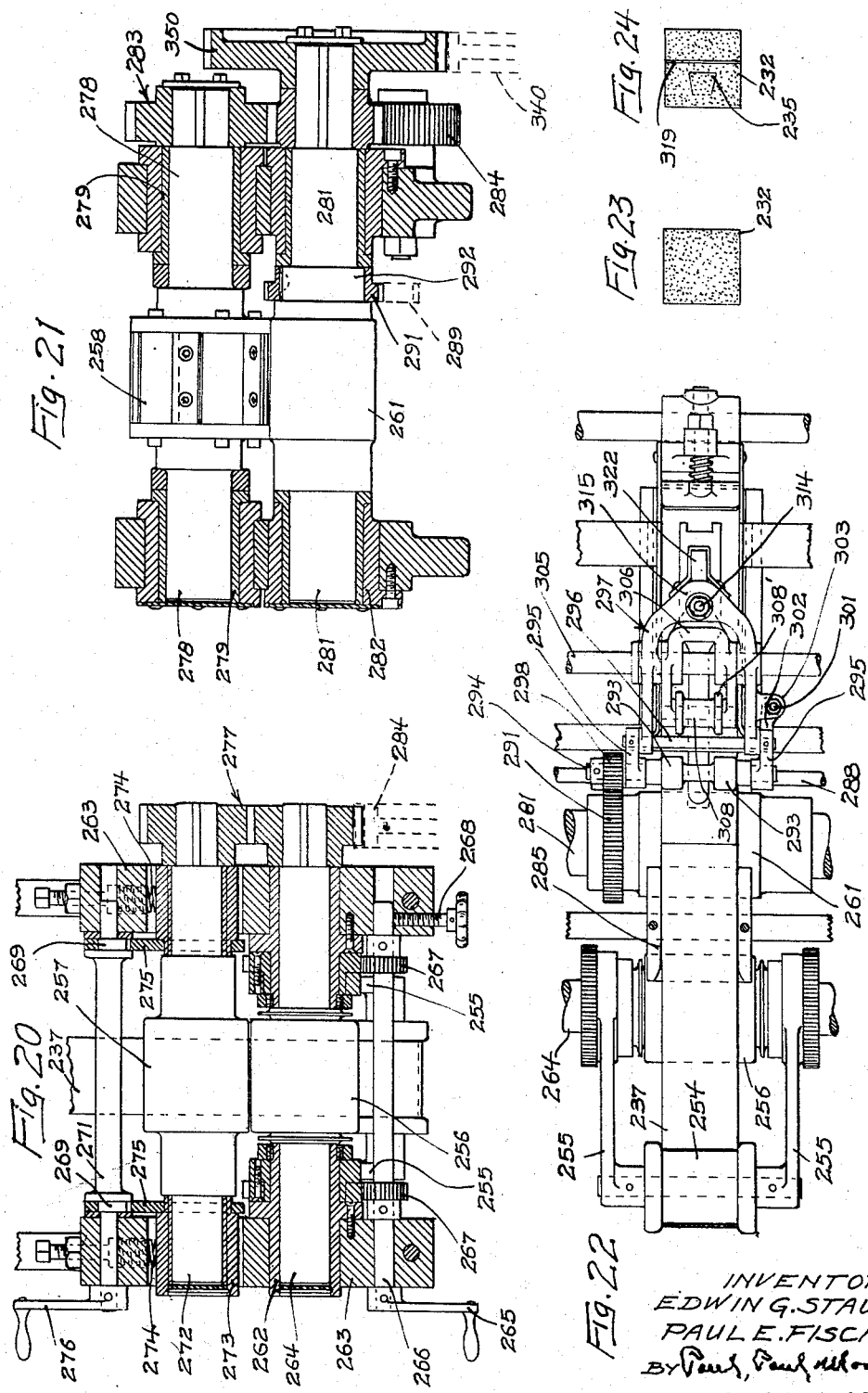

Feb. 19, 1946.  E. G. STAUDE ET AL  2,395,352
BOX MAKING MACHINE
Filed June 23, 1941   15 Sheets-Sheet 14
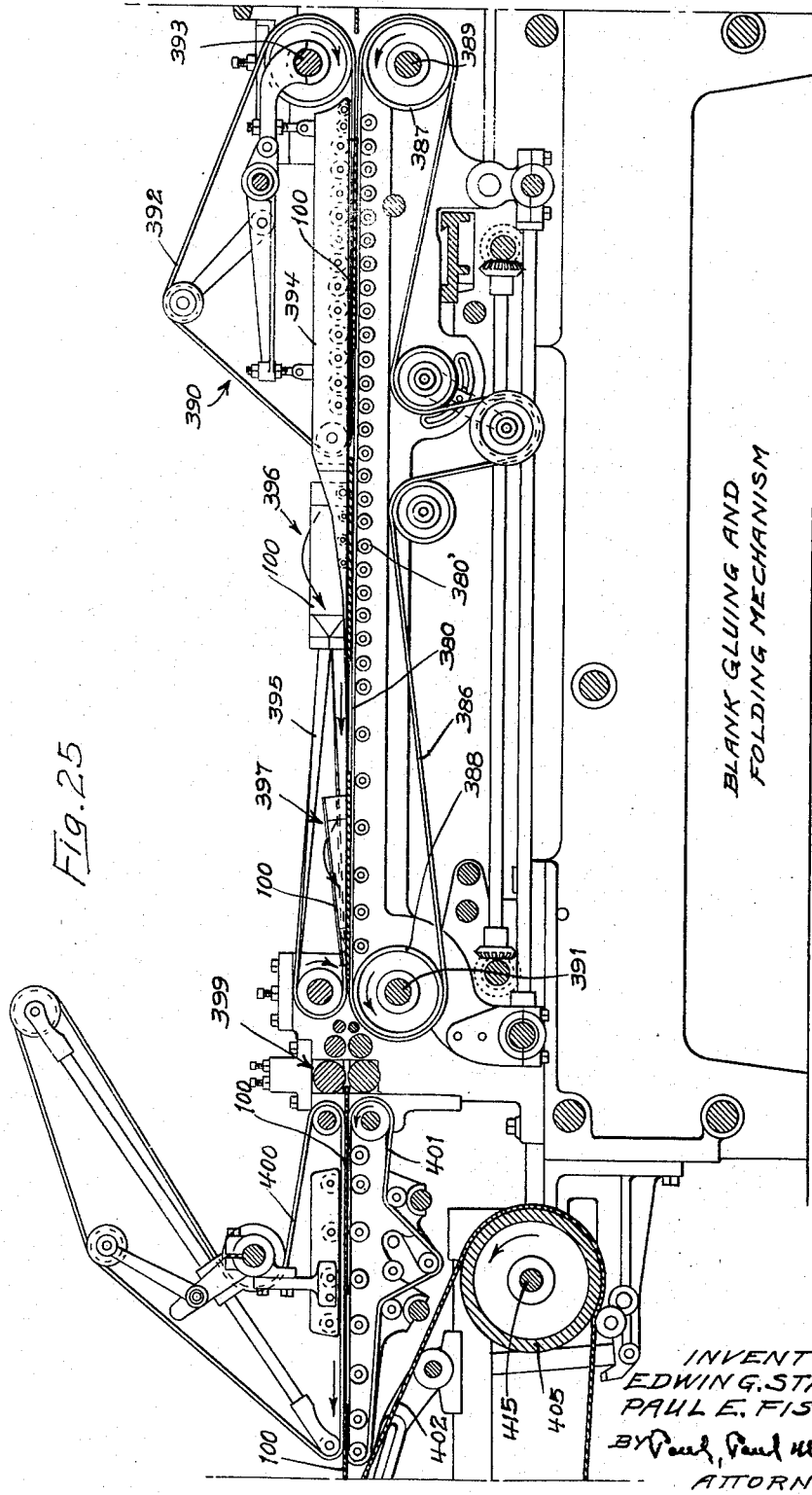
INVENTORS
EDWIN G. STAUDE
PAUL E. FISCHER
ATTORNEYS

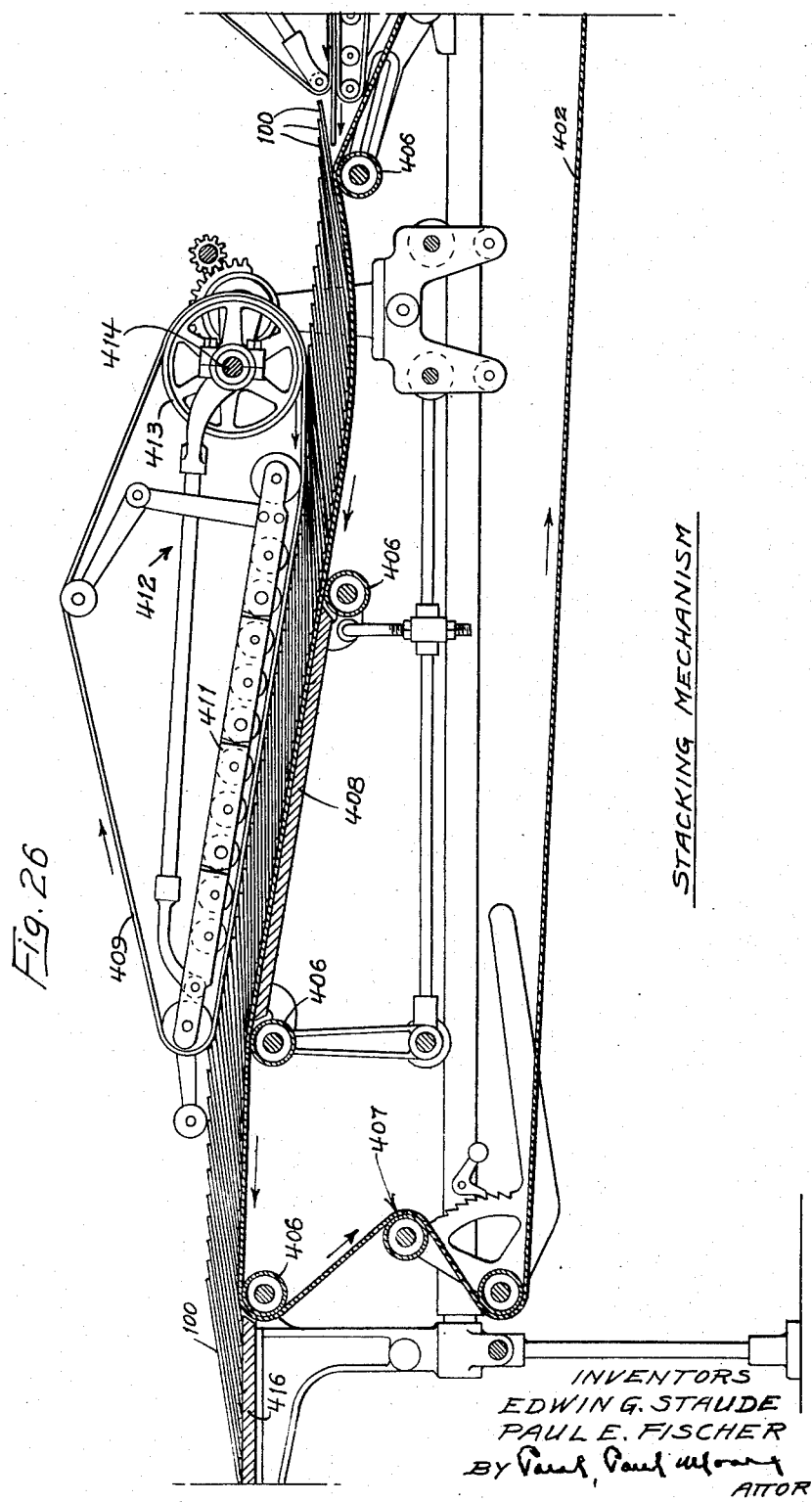

Patented Feb. 19, 1946

2,395,352

UNITED STATES PATENT OFFICE 2,395,352

BOX MAKING MACHINE

Edwin G. Staude, Minneapolis, and Paul E. Fischer, St. Paul, Minn., assignors to E. G. Staude Manufacturing Company, St. Paul, Minn., a corporation of Minnesota Application June 23, 1941, Serial No. 399,306

6 Claims. (Cl. 93—36)

This invention relates to new and useful improvements in paper box making machines, and more particularly to machines for making collapsible paper boxes or containers which are applicable for use in dispensing liquid commodities such as milk and cream.

An object of the invention is to provide a machine of the character disclosed in which the mechanisms for performing the various operations on the blanks to complete the formation of the boxes, are adapted for continuous rotary movement, whereby the machine may be operated at high speed.

A further object is to provide a box making machine comprising means for printing each blank and thereafter passing the printed blanks through a drying chamber, after which they are delivered to an inverting mechanism and turned over in position to receive a "pouring spout" patch which is applied to an inner wall surface of each blank, prior to completing the formation of the containers.

A further object is to provide a machine of the character described, having mechanism for applying a pouring spout patch to a wall of each blank to facilitate making a closable dispensing opening or pouring spout, said mechanism including means for severing said patches from a continuously traveling web and cutting a dispensing opening therein.

A further object is to provide an improved mechanism for positively and accurately applying a pouring spout patch to each carton blank, whereby each patch will be in proper registry with a dispensing opening previously formed in a wall of the blank.

A further object is to provide an improved blank inverting mechanism comprising a slowly rotating member provided with radially disposed blank supporting means or pockets adapted to receive the blanks from a feeding mechanism which, in the present instance, is interposed between said member and the drying chamber.

A further object is to provide a machine of the class described comprising a blank inverting mechanism including a rotary member adapted to receive the printed blanks and slowly turn them over or invert them, and having a continuously operating blank ejector adapted to successively and positively eject the blanks from the turnover device and deliver them, without interruption, onto a suitable receiving means.

Other objects of the invention reside in the novel arrangement of the operating mechanisms of the entire machine, whereby the machine may be operated at high speed; in the means provided for inverting each printed blank prior to receiving the pouring spout patch, which inverting mechanism operates at a relatively slow speed to permit the ink to dry sufficiently to prevent smearing, and, in the specific construction of the means provided for cutting the pouring spout patches from a continuously traveling web and applying such a patch to the unprinted inner side of each blank, prior to gluing and folding the blanks to complete the formation of the cartons.

Other objects of the invention will appear from the following description and accompanying drawings and will be pointed out in the annexed claims.

In the accompanying drawings there has been disclosed a structure designed to carry out the various objects of the invention, but it is be understood that the invention is not confined to the exact features shown as various changes may be made within the scope of the claims which follow.

In the drawings:

Figure 1 is a plan view of our improved machine showing the various mechanisms embodied therein for making completed cartons from a web of stock material;

Figure 2 is a view showing the blank from which the completed carton is made;

Figure 3 is a view showing the blank glued and folded to complete the collapsed flat carton;

Figure 4 is a perspective view of the upper portion of a carton showing the dispensing opening of the carton open;

Figure 5 is an enlarged plan view partially in section, showing the web trimming, feeding, and printing mechanisms provided at the receiving end of the machine;

Figure 6 is a detail view showing the ends of the two webs spliced together;

Figure 7 is a vertical sectional view on the line 7—7 of Figure 5, showing the web feeding mechanism and one of the printing units;

Figure 8 is an enlarged detail sectional view on the line 8—8 of Figure 5, showing the diagonal cutting device for trimming the ends of the webs prior to splicing them together;

Figure 9 is a plan view of the blanking, scoring, and creasing unit, shown in Figure 10;

Figure 10 is a vertical sectional view on the line 10—10 of Figure 9, showing the second printing unit, the blanking, scoring, and creasing unit, and the receiving end of the drying chamber;

Figure 11 is an enlarged cross-sectional view on the line 11—11 of Figure 10, showing the means for supporting the conveyer chains in the drying chamber;

Figure 12 is a plan view of Figure 13, showing the turnover device;

Figure 13 is a sectional elevation on the line 13—13 of Figure 12;

Figure 14 is an enlarged detail sectional view on the line 14—14 of Figure 12, showing the means for ejecting the blanks from the rotary turnover device;

Figure 15 is an enlarged detail sectional view on substantially the line 15—15 of Figure 13, showing a portion of the right angle conveyer onto which the blanks are successively fed from the turnover device, and also showing the pouring spout patch stock delivered to the machine from a roll of paper stock;

Figure 16 is a plan view of a portion of the right angle conveyer showing the means provided thereon for applying a reinforcing or pouring spout patch to each blank;

Figure 17 is a sectional elevation on the line 17—17 of Figure 16, showing the mechanism for cutting the pouring spout patches from the web of material and applying such a patch to each blank;

Figure 18 is an enlarged detail sectional view showing the construction of the patch cutting, scoring, and applying mechanism;

Figure 19 is an enlarged detail sectional view on the line 19—19 of Figure 18;

Figure 19—A is a detail sectional view on the line 19A—19A of Figure 18, showing the mounting of the retractable fingers in the patch slitting cylinder;

Figure 20 is a detail sectional view on the line 20—20 of Figure 18;

Figure 21 is an enlarged detail sectional view on the line 21—21 of Figure 18;

Figure 22 is a partial plan view of the patch feeding mechanism shown in Figure 18;

Figure 23 is a plan view of a pouring spout patch prior to being applied to a blank;

Figure 24 is a view showing the patch scored and creased;

Figure 25 is a sectional elevation of a mechanism for gluing and folding the blank into its completed box form; and Figure 26 is a sectional elevation showing a mechanism for stacking the completed collapsed boxes.

In the selected embodiment of the invention herein disclosed, there is illustrated in Figure 1, for purposes of disclosure, a box making machine comprising a plurality of mechanisms or units adapted to cooperate to form completed boxes or containers 2, shown in Figure 3, from a web of material 3 received from a suitable source of supply, such as a coil of paper 4. The coil 4 may be mounted on a suitable spool 5 carried by a shaft 6 mounted in suitable supports 7 of a turn table standard 8, partially shown at the right hand side of Figure 1. Means 9 is provided for laterally adjusting the roll of paper 4 with respect to the longitudinal centerline of the machine, whereby the web of paper may be alined therewith. A friction device 11 is also provided for preventing overrunning of the paper roll 4 during operation of the machine.

*Trimming Mechanism (Figures 1, 5, 6, 7, and 8)*

From the supply roll 4, the web 3 passes beneath a roller 12 adapted to rotate freely on a shaft 13 supported in the terminals of a pair of brackets, generally designated by the numeral 14, secured to the side frame members 15, as clearly illustrated in Figure 7. From the roller 12, the web passes over a second roller 16 and onto a table or plate 17 having guides 18 at each side thereof, for guiding the web lengthwise through this portion of the machine. The plate 17 is mounted on the upper horizontal portion 19 of the brackets 14, and is provided with a diagonal groove 21, shown in Figure 8. A cutter bar 22 is secured in the groove 21 with its upper surface substantially flush with the upper surface of the table 17, as clearly shown in Figure 8.

A cutter head 23, having a rotary knife 24 mounted thereon, is adapted for traveling movement on a supporting bar 25 diagonally disposed over the table 17, as shown in Figures 1, 7, and 8. The cutting edge of the disk-like knife 24 cooperates with one side of the cutter bar 22 to transversely sever the paper web on a diagonal, when the cutter head 23 is longitudinally moved on the supporting bar 25, as will readily be understood by reference to Figures 1, 7, and 8. The supporting bar 25 is mounted on suitable standards or posts 26, shown in Figure 7. The cutter head 23 is shown provided with a suitable hand knob 27, whereby the cutter head 23 may conveniently be moved back and forth on the supporting bar 25 as will readily be understood. The rotary disk knife 24 is yieldably held against the cutter bar 22 by a suitable spring 28, whereby when the cutter head is moved across the table 17, the web of paper will be severed.

The above described mechanism provides means whereby the ends of two webs may readily and quickly be spliced together, as shown, for example, in Figure 6, wherein 29 represents one end of a fresh roll of paper, and 30 the tail end of another roll which has been used up in the formation of boxes or containers. To splice together the ends 29 and 31 of the two webs, as shown in Figure 6, the cutter head 23 is used to diagonally sever or trim the ends of said webs, whereby when the two ends are abutted together, as shown in Figure 6, they may be united to form a continuous web or strip, by the application thereto of a gummed strip 31. By thus being able to splice together the adjacent ends of two webs, such operation may be quickly and accurately performed in a minimum of time, and because of the joint being disposed at a diagonal, the stress exerted on the gummed strip 31 is greatly reduced because portions of the two webs will always be in feeding contact with the web feeding means, subsequently to be described.

A revolving brush 32 is shown mounted directly over the roller 16, as shown in Figure 7. The brush 32 is rotated in the direction indicated by the arrow and contacts the surface of the web 3 whereby all loose particles which may adhere to the upper surface of the web, are swept therefrom by the action of said brush, as will readily be understood. The roller 16 and brush 32 are driven by a chain 33 which, in turn, is driven from a shaft 34 through a suitable gear drive supported within a housing 35, as best shown in Figure 5. The shaft 34 is shown supported within a tubular casing 36.

From the table 17, the web passes between a pair of rollers 37 and 38, and thence upwardly over a bar 39 which is more or less square in cross section, as best illustrated in Figure 7. The bar 39 is rotatably supported in arms 41 secured to a shaft 42 rotatably mounted in the side frame members 14, as shown. The worm gear 43 is secured to the shaft 42 and meshes with a worm 44 secured to the upper end of a shaft 45 mounted in suitable bearings provided in the bracket 14 and side frame member 15 of the machine frame. A suitable hand wheel 46 is secured to the upper end of the shaft 45, whereby it may be conveniently rotated to adjustably position the bar 39 to increase or decrease the reverse bending action of the web 3 by the roller 39. The object of reversibly bending the web 3 by the roller 39, as above described, is to prevent or minimize the curling tendency of the web, caused by being coiled on the spool 4, as will readily be understood. The lower end of the shaft 45 is operatively connected to a horizontal shaft 47 by suitable mitre gears 48, as shown in Figure 7. A hand wheel 49 is operatively connected to the opposite end of the shaft 47 through mitre gears 50, as shown in Figure 9.

*Feeding mechanism (Figures 1, 5, and 7)*

From the trimming mechanism, the web is delivered to a feeding mechanism, shown comprising a driven feed roller 51 journaled in fixed bearings provided in upright frame members, generally designated by the numeral 52, and comprising upper and lower sections 53 and 54, respectively. Suitable pressure rollers 55 and 56 are mounted above and below the driven feed roller 51, and are supported on shafts 57 and 58, respectively which, in turn, are mounted in movable bearings, whereby the rollers 55 and 56 may be relatively adjusted with respect to the driven roller 51, to vary the gaps between said rollers. Worm gear drives, generally designated by the numeral 59, are operatively connected to the movable bearings of the rollers 55 and 56, and said worm gear drives are preferably operatively connected together, whereby said bearings may be simultaneously adjusted by manipulation of a suitable hand wheel 61, secured to a cross shaft 60, as best shown in Figure 5. Thus, by rotating the hand wheel 61, the gap between the upper roller 55 and the driven roller 51, and also the gap between the lower roller 56 and the driven roller 51 may be varied in accordance with the thickness of the web to obtain the proper feeding contact with the web and whereby said rollers will draw the web from the supply roll through the trimming unit, and deliver it into the next mechanism of the machine without slippage.

As best shown in Figure 7, the web is passed from the bar 39 over the upper roll 55 and then downwardly between the rollers 55 and 51, and between the rollers 51 and 56, whereby the web follows substantially an S-shaped path in its travel from the roller 39 to the point where it leaves the driven roller 51 and roller 56. The shaft 50 of the driven roller 51 is shown provided with a spiral gear 62 driven from a spiral pinion 63 secured to the shaft 34, as shown in Figure 5. The rollers 51, 55 and 56 are geared together for simultaneous operation by suitable gears 64, the pitch diameters of which are coincident with the diameters of the rollers 51, 55, and 56.

*Printing mechanism (Figures 1, 5, 7, 9, and 10)*

In the apparatus as herein disclosed, means is provided for applying printed matter to the web, prior to cutting it into blanks. The means provided for thus applying printed matter to the web in spaced areas along its length is best shown in Figures 7 and 10. As here shown, the printing mechanism comprises two separate printing units, generally designated by the numerals 65 and 66, which may be identical in construction. Two such printing units are utilized when the printed matter embodies two colors of ink. If only one color is to be used as, for example, black, one printing unit will suffice. The printing units may be of conventional design and therefore, need not be described in detail. Each unit, however, comprises cooperating cylinders 68 and 69 between which the web is fed, as clearly illustrated in Figures 7 and 10. Suitable inking mechanisms, generally designated by the numeral 71 are provided for supplying the upper cylinders 68 with ink in a manner well known to the trade. The cylinders are driven from the shaft 34 by suitable spiral gear drives 72, shown in Figures 5 and 9. The cylinders 68 and 69 of each printing unit are geared together by suitable gears 73. In the machine as herein disclosed, the printing is done directly on the web 3 before the latter is severed or cut into blanks, as will subsequently be described. It is therefore of utmost importance that the web be fed through the machine without slippage, which is made possible by the unique feeding mechanism, hereinbefore described.

*Blanking and creasing mechanism (Figures 1, 9, and 10)*

From the printing unit 66, the web 3 is delivered to the blanking and creasing mechanism, shown in Figures 9 and 10. This mechanism is shown comprising a pair of narrow-faced die wheels 74 and 75 mounted in spaced relation on a shaft 76. A pair of co-acting wheels 77 are mounted on a shaft 79 directly below the wheels 74 and 75, and are vertically alined with said wheels. These wheels carry suitable male and female die blocks 81 and 82 which are adapted to engage the web and punch out portions thereof, as indicated at 83 and 85 in Figure 2. The wheel 75 has a creasing bead 78 which cooperates with a groove in the lower wheel 77 to provide a fold line 85' in the blank, as shown in Figure 2. The shafts 76 and 79 are geared together for simultaneous operation in opposite directions.

Feed wheels 86—86 are mounted in spaced relation on a shaft 87 and are adapted to hold the partially scored web in feeding contact with a feed cylinder 88, mounted beneath the path of travel of the web on a shaft 89, as best shown in Figures 9 and 10. The feed wheels 86—86 are adjustably mounted on the shaft 87 to adapt the machine for blanks of different widths, and the shaft 87 is vertically adjustable with respect to the feed cylinder 88 to control the feeding contact of the wheels 86 with the web, thereby to insure positive feeding of the web at the proper speed. The means for vertically adjusting the feed wheels 86 is shown comprising suitable worm gearing 86' adapted to be actuated by a cross shaft 80 provided at one end with a suitable hand wheel 80'. The shafts 87 and 89 are geared together for simultaneous operation in opposite directions in a manner similar to the die wheels 74 and 75.

From the feed wheels 86—86 and cylinder 88, the web passes between two blanking and creasing cylinders 92 and 93 having shaft extensions rotatably supported in suitable bearings provided in the machine frame, as will be understood by reference to Figures 9 and 10. The blanking cylinders 92 and 93 are provided with suitable cutting and creasing dies which engage the web and crease it, as shown in Figure 2, and also cut out the blanks from the web, whereby the web is divided into a plurality of separate blanks 100, each shaped as shown in Figure 2.

The cutting and creasing cylinder 93 is driven from a pinion 94 meshing with a gear 95 secured to a shaft extension 96 shown integrally formed with the cylinder 93. The feed wheels 86—86 and their co-acting feed cylinder 88 are driven from the cylinder 93 by an intermediate gear 97, and the die wheels mounted on the shafts 76 and 79 are driven from the shaft 89 by an intermediate gear 98. The intermediate gears 97 and 98 are indicated in dotted lines in Figure 10. Suitable adjusting means, shown at 90 in Figure 10, are provided for holding the feed wheels 74 and 75 in operative relation to their lower co-acting wheels 77, and the upper blanking cylinder 92 is shown provided with a similar adjusting means 90 for controlling the operative relation between the cylinders 92 and 93. The pinion 94 is driven from a shaft 99 through a bevel gear drive, generally indicated by the numeral 101, in Figure 9. By reference to this figure, it will be noted that the shaft which transmits power to the feeding and printing mechanisms is driven from the shaft 99 through a pair of gears, generally designated by the numeral 102.

The blanks 100 are completely cut or severed from the web substantially without waste and are creased and cut, as shown in Figure 2, as they pass through the blanking and creasing mechanism. The shaft 76—79 and 87—89 and the shafts of the blanking and creasing cylinders 92 and 93 are all interconnected by suitable gears, shown in Figures 9 and 10. A suitable hand wheel 87' is provided on one end of the shaft 87 to facilitate preliminary setting up and adjustment of the various feed wheels and cylinders in the blanking and creasing mechanism.

A pair of high speed rollers, generally designated by the numerals 103 and 104, are arranged adjacent to the blanking and creasing cylinders 92 and 93, as shown in Figure 10. These rollers operate at a relatively higher peripheral speed than the cylinders 92 and 93, whereby they increase the traveling speed of the moving blanks, when the latter leave the cylinders 92 and 93, thereby to separate the blanks from one another in the direction of travel, as the blanks are discharged from the blanking and creasing mechanism. The feed wheels and cylinders of the blanking and creasing mechanism are so arranged on their respective shafts, and with respect to the printed matter on the web, as to avoid directly contacting and smearing the freshly applied ink on the upper surface of the web.

*Drier (Figures 1, 9, 10, 12, and 13)*

When the containers or boxes are to have printed matter applied thereto, as is usually necessary when they are to be used for the distribution of milk, cream, and analogous commodities, it is highly desirable that means be provided for expediting the drying of the ink in order that the machine may be operated at high speed. Means is therefore provided for quickly drying the fresh ink so that each blank may be inverted to receive a pouring spout patch, as will subsequently be described.

The drier, as best illustrated in Figures 9 and 10, is shown comprising a chamber 105 defined by a casing, generally designated by the numeral 106. The casing may be suitably supported on cross members 107 secured to the side frame members of the machine frame.

A pair of spaced rails 108 extend lengthwise through the heating chamber 105, and are supported on brackets 109 adjustably mounted on cross shafts or rods 111 mounted in brackets 112 and 113 provided, respectively, at the receiving and discharge ends of the drying chamber 105, as shown in Figures 10 and 13. By adjustably supporting the brackets 109 on the cross rods 111, the rails 108 may be independently adjusted transversely of the machine to adapt the machine for blanks of different sizes. Each rail 108 is preferably composed of a plurality of flat bars secured together to form guideways for a pair of conveyor chains 114, having spaced lugs 115 thereon adapted to engage the trailing edges of the blanks and positively feed them through the chamber 105.

The chains 114 are mounted on sprockets 116 at the receiving end of the chamber 105, and on sprockets 117 at the discharge end of the chamber 105. The sprockets 116 are secured to a shaft 118 mounted in suitable bearings provided in the brackets 112, and spaced feed wheels 119 are mounted on a shaft 121 directly over the shaft 118, as shown in Figure 10. The feed wheels 119 cooperate with rollers 120, mounted on the shaft 118, to feed the blanks onto the rails 108 in position to be engaged by the lugs 115 of the conveyer chains 114, it being understood that the blanks are delivered to the feed wheels 119 and 120 in timed relation by the action of the rollers 103 and 104 of the blanking and creasing mechanism. The shafts 118 and 121 are geared together for simultaneous operation in opposite directions by suitable gears 122, shown in Figure 9. Suitable springs 123 may be provided for yieldably holding the feed wheels 119 in operative relation to their complemental feed wheels 120.

Guide bars 124 are provided at each side of the travel path of the blanks and have longitudinally extending grooves 125 in their inwardly facing edges adapted to receive the outer end portions of the flaps of the blanks, as clearly illustrated in Figures 9 and 11. Hold-down bars 126 are disposed over the conveyer chains 114 to hold the blanks downwardly into operative relation to the lugs 115 of the conveyer chains 114, to insure positive feeding of the blanks. The hold-down bars 126 are shown supported by upright rods 127 having their upper ends adjustably secured in brackets 128 mounted for lateral adjustment on a cross shaft or rod 129, as clearly illustrated in Figures 9 and 10. The lower runs of the conveyer chains 114 may be supported on suitable idler pulleys, one of which is shown in Figure 10.

The means for heating the drying chamber 105 is shown comprising a plurality of steam nozzles 131, mounted in a pair of distributor pipes 132 disposed crosswise of the path of travel of the blanks, as shown in Figure 10. The distributor pipes are connected at one end to a suitable manifold 133 to which superheated steam is supplied from a pipe 134 having a control valve 135 provided therein. The superheated steam delivered into the chamber 105 from the nozzles 131 is directed into intimate contact with the printed matter appearing on the blanks, and because of its high temperature, and moisture content, the ink is dried considerably as the blanks pass through the drying chamber 105. The sprockets 117 are secured to a cross shaft 136 which is driven by a chain 137, shown in Figures 12 and 14.

A pair of brushes 138 and 139 are secured to a shaft 141 mounted directly over the shaft 136, as shown in Figure 13. These brushes lightly engage the upper surfaces of the blanks to guide them between a pair of driven rollers 142 and 143 mounted on shafts 144 and 145, respectively, as shown in Figure 13. The rollers 142 and 143 are driven from the shaft 136 through an intermediate gear 146, which meshes with gears 147 and 148 provided respectively on the shafts 136 and 145. The shaft 141, to which the brushes 138 and 139 are secured, is shown driven by a chain 149 from the shaft 136.

*Inverting mechanism (Figures 1, 12, 13, and 14)*

In containers or boxes of the character herein disclosed, a pouring spout patch is secured to an inside wall section or panel of each blank, and to facilitate this operation, the blanks are positioned with the printed side down, when applying the patch thereto. It is therefore esssential that means be provided for inverting each blank before it is delivered to the patch cutting and applying mechanism.

The novel inverting mechanism herein disclosed, is shown comprising a rotatable member or wheel, generally designated by the numeral 151, mounted on a cross shaft 152 supported in suitable bearings 153 and 154 provided on the side frame members of the machine frame, as best shown in Figure 12. The member 151 is shown comprising oppositely disposed hubs 155, which are secured to the shaft 152 by suitable means, not shown in the drawings. Each hub has secured thereto, a circular disk 156, which disks are provided with inwardly projecting radial flanges 157, as clearly illustrated in Figures 13, 14, and 15. The corresponding flanges of adjacent disks 156 are alined, as shown in Figure 14, whereby said flanges constitute in effect, a plurality of radially disposed pockets 158. Each pocket 158 is adapted to receive a printed blank from the drier, as shown in Figure 13. By reference to Figures 12 and 14, it will be noted that the central or main body portion of each blank is unsupported by the flanges 157, whereby should the ink not be thoroughly dry when the blanks are delivered into the pockets 158 from the drier, the printed surfaces of the blanks will not come into contact with any objects until the blanks are about to be discharged from the rotary member 151.

Means is provided for driving the rotary member 151 at a relatively slow speed and, as shown in Figure 12, comprises a gear 159 secured to the shaft 152 and a pinion 161 meshing with the gear 159 and secured to a short countershaft 162 provided at its outer end with a relatively larger gear 163. The gear 163 meshes with a pinion 164 provided on a hub 165 rotatably mounted on the outwardly extending end portion 166 of the shaft 152. The hub 165 has another gear 167 which meshes with a pinion 168 driven from the shaft 99 by a suitable bevel gear drive provided in a housing 169, shown in Figure 12. The chain 137 which drives the conveyer shaft 136 is driven from a suitable sprocket secured to the hub 165, as will be understood by reference to Figure 12.

The means for consecutively ejecting the blanks from the rotatable member 151 is best shown in Figures 13 and 14, and comprises a pair of spaced parallel chains 171 mounted on sprockets 172 and 173. The sprockets 172 are mounted on a shaft 174 which is driven from the hub 165 by a suitable chain 175, as shown in Figure 12. The chains 171 are provided with suitable lugs 176 and have their upper runs adapted to travel in guide rails 177 which support the upper runs of the chains, as will readily be understood by reference to Figures 13 and 14.

The rails 177 are supported on brackets 178 mounted on cross rods 179, as shown in Figure 13. The rods 179 are suitably supported in brackets 181 secured to the side frame members of the machine. The inner sprockets 173 are suitably supported on the inner ends of the rails 177, and are disposed adjacent to the shaft 152, whereby the blanks carried around in the pockets 158 of the member 151 are deposited in the path of the lugs 176 of the chains, as shown in Figures 13 and 14, whereby the conveyer chains will project the blanks between a pair of driven feed rolls 182 and 183 mounted respectively on shafts 184 and 185. The shafts 184 and 185 are geared together for simultaneous operation in opposite directions and are driven from the shaft 174 through a train of gears 186, shown in Figure 12. The upper feed rolls 182 are vertically adjustable with respect to their lower complemental rolls 183 by suitable adjusting means 187, including springs 188 for yieldably holding the rolls 182 in operative relation to the lower rolls 183.

The inverting mechanism, above described, forms an important part of the present invention in that it serves the dual purpose of slowly conveying the partially dry printed blanks from the drier to the patch cutting and applying mechanism in spaced relation, whereby air may freely circulate therebetween to more thoroughly complete the drying of the ink, and, at the same time, it inverts the blanks and delivers them to the patch applying mechanism in position to receive a pouring spout patch or section, as will next be described.

*Patch cutting and applying mechanism (Figures 15 to 22)*

The patch cutting and applying mechanism is arranged to receive the blanks from the feed rolls 182 and 183, and is shown comprising a pair of spaced conveyer chains 189 disposed in right angular relation to the initial path of travel of the blanks through the blanking and creasing mechanism, as clearly illustrated in Figure 1. The conveyer chains 189 are provided with blank engaging lugs 191 adapted to engage the trailing ends of the blanks, and are supported at one end upon a pair of sprockets 192, secured to a shaft 193 mounted in suitable bearing blocks 194 carried by the machine frame, as shown in Figure 17. The opposite ends of the conveyer chains are supported on sprockets 196 adjustably mounted in brackets 197 secured to a cross frame member 198 suitably secured to the main supporting frame of the machine, as shown in Figure 15.

The upper runs of the conveyer chains 189 are supported in longitudinally extending rails 199 and 201, supported at one end on the cross frame member 198 and a similar cross member 202, and at their opposite ends on a cross rod or shaft 203, carried by upright brackets 204 having their lower ends supported on a cross rod or shaft 205. The rails 199 and 201 and also the chains 189, may be adapted for lateral adjustment to vary the spacing therebetween to adapt the machine for blanks of different sizes and shapes. Suitable idler sprockets 206 are suspended from cross shafts 207 carried by the rails 199 and 201, for supporting the lower runs of the chains, as clearly illustrated in Figure 17.

The blanks are successively delivered onto the rails 199 and 201 in position to be engaged by the lugs of the conveyer chains 189. To accurately position the blanks on the rails 199 and 201, an abutment or stop bar 208 is arranged adjacent to the rail 201 in alinement with the initial path of travel of the blanks. Each blank is projected against this stop bar by the feed rolls 182 and 183, assisted by a driven roller 209 disposed above the blank, and co-acting rollers 211 located below the plane of a blank positioned on the rails 199 and 201, as clearly illustrated in Figure 13. A suitable flange 212 is preferably secured to the stop bar 208 to downwardly direct the leading end of each blank. The trailing end portion of each blank is pressed downwardly onto the rail 199 by a plurality of cam elements 213 mounted on a shaft 214 rotatably supported in hangers 215 secured to a pair of caps 217 which may be adjustably supported in the upper ends of the brackets 181, as best shown in Figure 13. The cross rod 218 is interposed between the caps 217, as shown in Figures 13 and 15.

The roller 209 is supported in arms 219 pivotally supported on the shaft 214, and is adapted for limited adjustment thereon by suitable adjusting screws 221, thereby to slightly vary the spacing between the roller 209 and rollers 211. The cam shaft 214 is driven from the shaft 184 through a train of gears, generally indicated by the numeral 222, and operates in timed relation to the traveling movement of the blanks, as they are delivered thereto. The rollers 211 are driven from a gear 223 meshing with suitable pinions mounted on the shafts of the rollers 211. The gear 223 is rotatably mounted on a stud 224 and is driven by a chain drive 225 from a train of gears 186, shown in Figures 12 and 13. Longitudinally extending guide bars 226 are disposed in parallel relation to the rails 199 and 201 and extend from the stop bar 208 to a point adjacent the sprocket shaft 193. These guide bars are grooved to receive the opposed edges of the blanks, as clearly shown in Figure 12, thereby to positively prevent the blanks from becoming disengaged from the lugs 191 of the conveyer chains 189.

Containers adapted for dispensing milk, cream, and such commodities, when filled, are usually sealed by folding the flaps at the top of each container into closing and sealing relation, as generally indicated at 227 in Figure 4. Such containers are therefore preferably provided with a dispensing or pouring opening 228, partially completed by slitting the blank as indicated at 229 in Figures 2 and 3, whereby a closure flap 231 is provided, when the portion defined by the slitting 229 is severed by upwardly pulling the flap 231, as shown in Figure 4. A flap 231, such as shown in Figure 4, usually does not provide an adequate closure for the container, once it had been opened, and a suitable patch or section 232 of sheet material, such as paper, is therefore applied to the inside surface of the panel 233 of each blank, as shown in Figure 2. This patch, it will be noted by reference to Figures 2 and 4, overlies the slitting or tearing line 229 and is provided with a pouring opening 234, formed by partially cutting a section 235 from the body of the patch, as clearly illustrated in Figures 4 and 24. The section 235 is cut on three sides, whereby it may hinge at its unsevered side 236, as shown in Figure 4, when the closure flap 231 is opened. The section 235 of the patch 232 is secured to the flap 231 by suitable adhesive, as will subsequently be described, whereby when the flap 231 is moved into closing position, the section 235 will fit into the opening 234 in the patch and thereby cooperate with the overlapping marginal edge portion of the closure flap 231 to close the pouring opening of the container.

An important feature of the present invention resides in the provision of means for automatically cutting the patches 232 from a continuously traveling strip of material and applying such a patch to each blank in accurate registry with the closure flap 231, as the container blanks 100 travel uninterruptedly through the machine. The patch material or strip 237 is shown supported on a spool 238 in the form of a coil 239. The spool 238 may be mounted on a shaft or spindle 241 having its end portions journaled in open bearings 242 provided at the outer ends of brackets 243, secured to the main frame of the machine, as clearly illustrated in Figure 15. Two brackets 243 are preferably provided, one at each side of the coil 239, and a transverse roll 244 is supported on said brackets, as shown in Figure 15, adapted to be engaged by the web or strip of patch material 237. From the roll 244, the strip material passes over a roll 245 and onto a horizontally disposed, inverted channel 246, mounted over the conveyer chains 189, as shown in Figures 15 and 17. A suitable brake drum 247 is provided on the spool 238 adapted to be engaged by a brake shoe 247', thereby to prevent overrunning of the roll 239.

Means, generally designated by the numeral 248 in Figure 1, is provided for laterally adjusting the patch supply coil 237 with respect to the channel member 246. This adjusting mechanism is shown provided with a hand wheel 249 located adjacent to the roll 237 and having an operative connection with one end of a shaft 251, the opposite end of which is provided with a hand wheel 252, whereby an operator stationed remote from the patch supply coil 239 may laterally adjust said coil to aline it with the channel member 246, by manipulation of the hand wheel 252 at the front of the machine, or the hand wheel 249 adjacent to the coil 239.

From the coil 239, the strip of patch material 237 travels over the channel member 246 to an idler roll 253 and thence to a roll 254 mounted on a pair of arms 255 mounted for pivotal movement about the axis of a feed roll 256 co-acting with a complemental feed roll 257 to feed the strip 237 to a cutting roll 258. The cutting roll 258 is provided with a plurality of radially disposed knives 259, which cooperate with a roll 261 to transversely sever the strip into patches 232, such as shown in Figures 23 and 24.

The arms 255 of the roll 254 are shown pivotally supported upon the inner ends of opposed bearing sleeves 262, non-rotatably secured to the side frame members 263. The sleeve members 262 rotatably support the shaft extensions 264 of the feed roll 256, as shown in Figure 20. The arms 255 are swingable from the full to the dotted line positions show in Figure 18, whereby the tension in the strip 237 may be released, when desired, by manipulation of a crank 265, secured to a shaft 266 rotatably mounted in the side frame members 263 and having pinions 267 engaging ring gears secured to the hubs of the arms 255, as clearly illustrated in Figure 20. A lock screw 268 may be provided for locking the shaft 266 in adjusted position.

The upper feed roll 257 is adapted for limited movement away from the feed roll 257 to permit feeding a new strip of patch material between the feed rolls 256 and 257. The means for thus laterally moving the feed roll 257, is shown comprising eccentrics 269 secured to a shaft 271 rotatably supported in the frame members 263, as shown in Figure 20. The feed roll 257 has its shaft extensions 272 mounted in bearing blocks 273, non-rotatably but movably supported in the side frame members 263. Suitable springs 274 constantly urge the bearing blocks downwardly to move the feed roll 257 into feeding engagement with the strip 237, as will readily be understood by reference to Figure 20. Means is provided for adjusting the tension in the springs 274 to obtain the desired feeding engagement of the feed roll 257 with the strip 237. Links 275 connect the bearing blocks 273 with the eccentrics 269 on the shaft 271, whereby when the crank 276 is manipulated to rotate the shaft 271, the links 275 are actuated to move the bearing blocks upwardly in their guides to thereby move the upper feed roll 257 out of feeding engagement with the patch strip 237. The feed rolls 256 and 257 are geared together for simultaneous rotation in opposite directions by suitable gears, generally indicated by the numeral 277. The cutting roll 258 has shaft extensions 278 mounted in suitable bearings 279 provided in the side frame members of the machine frame, as best shown in Figure 21. The lower roll 261 is provided with similar shaft extensions 281 mounted in bearing blocks 282, and a pair of gears, generally designated by the numeral 283, operatively connecting together the rolls 258 and 261. The feed rolls 256 and 257 are driven from the roll 261 by an intermediate gear 284, interconnecting the gears 277 with the gears 283, as indicated in dotted lines in Figures 17 and 18.

As best shown in Figure 18, the strip of patch material 277 is fed from the feed rolls 256 and 257 over a fixed plate 285, and between the cutting roll 258 and its complemental roll 261. The cutting knives 259 in the cylinder 258 are preferably spaced equi-distant apart around the circumference of said cylinder, and the circumferential spacing between said knives determines the length of the patch 232, as will readily be understood by reference to Figure 18. The patches 232 severed from the strip 237 by the cutting roll 258, are fed onto a narrow supporting plate 286, disposed between a pair of driven feed rolls 287, secured to a shaft 288 having its end portions rotatably supported in the side frame members of the machine. A pinion 289, indicated in dotted lines in Figure 21, meshes with a ring gear 291 shown secured to the enlarged portion 292 of one of the shaft extensions 281 of the roll 261. The rollers 287 are spaced apart lengthwise of the shaft 288 to receive therebetween the plate 286, as will be understood by reference to Figures 18 and 22.

A pair of complemental feed rollers 293 are mounted on a shaft 294 rotatably supported in arms 295 secured to a shaft 296 which, in turn, is mounted for rocking movement in the arms of a yoke, generally designated by the numeral 297. The shaft 294 of the rollers 293 has a pinion 298 secured thereto, which meshes with the pinion 289 secured to the lower shaft 288, whereby the rollers 287 and 293 rotate in opposite directions, as will be understood. The rollers 293 are arranged directly over the lower rollers 287.

Means is provided for constantly urging the upper rollers 293 into patch-feeding engagement with the lower rollers 287, as best shown in Figure 18, and comprises a spring 299 mounted on a stud 301 fixed to a lug 302 provided on one of the arms 295, as will be understood by reference to Figures 18 and 22. The stud 301 passes freely through an aperture in a lug 303 provided on one of the arms of the yoke 297. The spring 299 is interposed between the lug 303 and a nut 304 secured to the upper end of the stud. Adjustment of the nut 304 on the stud will vary the feeding contact of the upper rollers 293 with their complemental rollers 287. The yoke 297 is mounted for rocking movement on a shaft 305 having its end portions supported in the side frame members of the machine.

A relatively smaller yoke 306 is mounted on the shaft 305 between the arms of the relatively larger yoke 297, as shown in Figure 22, and carries a roller 308 having end flanges 308' adapted to engage each patch as the patches are discharged from the rollers 293 and 287, and thereby feed the patches into contact with the peripheries of a pair of creasing and slitting cylinders, generally designated by the numerals 309 and 310. An arcuately formed plate 311 extends around a portion of the periphery of the cylinder 309 in spaced relation thereto, as shown in Figure 18, and serves to hold the patches in contact with the periphery of said cylinder, as they travel from the roller 308 to the relatively larger creasing and slitting cylinder 310. The relatively smaller yoke 306 has an arm 313 carrying a stud 314 which is slidably received in an aperture provided in the end portion 315 of the larger yoke 297. A spring 316 is coiled about the stud 314 and has its lower end seated against the yoke 297 and its upper end against a nut 317, adjustably secured to the upper end of the stud 314 and whereby the feeding action of the roller 308 may be varied, as desired.

The cylinder 310 carries suitable slitting or cutting knives 318, adapted to cooperate with suitable die blocks 312 provided in the periphery of the cylinder 309, thereby to slit or cut the patch 232, as shown in Figure 24, to provide a pouring opening in the patch. Each patch is also provided with a score line 319, to facilitate bending the patch as shown at 321 in Figure 4, when folding the top wall portions of the container into closing relation. The severed portion indicated by the numeral 235 in Figure 24, when open, as shown in Figure 4, provides the pouring opening or spout 234 of the container.

To accurately control the feeding of the patches between the cylinders 309 and 310, a rubber element 322 is shown carried by the yoke 297 and has its lower end shaped to substantially fit the curvature of the periphery of the cylinder 309. The yoke 297, it is to be understood, is fixed to the shaft 305 which, in turn, is non-rotatably supported in the side frame members. The rubber element 322 is normally interposed in the path of the advancing patches, and serves to retard or temporarily interrupt the movement of each patch prior to being delivered between the cylinder 309 and 310.

To positively feed the patches between the rollers 309 and 310 in timed relation, two pairs of retractable fingers are provided in the cylinder 309, arranged in diametrically opposed relation. The fingers 323 and 324 of each pair are secured to a rock shaft 325. The rock shafts 325 are mounted in suitable bearings provided in the cylinder 309, as best shown in Figure 19—A. The arm of each finger 324 is engaged by a spring 326 arranged to constantly urge the tip of the finger outwardly beyond the periphery of the cylinder 309, as will be understood by reference to Figure 18. The arm of the finger 323 carries a roller 327 adapted to ride on an internal cam 328, secured to a fixed support 330, shown in Figure 19. The contour of the cam 328 is such that as each pair of fingers approach the top of the cylinder 309, they are projected outwardly beyond the periphery of said cylinder, into engagement with the trailing end of a patch positioned beneath the curved plate 311 with its leading end in engagement with the rubber element 322. As the trailing end of each patch is thus engaged by the retractable fingers 323 and 324, said patches are fed between the cylinders 309 and 310 to be slitted and creased as hereinbefore described. The curved guide plate 329 guides the slitted patches downwardly from the point of contact between the cylinders 309 and 310, into engagement with the upper surface of a container blank 100 being advanced by the conveyer chains 189. Each patch is accurately positioned in registry with an adhesive coated area 331 provided on each blank by a suitable mechanism, subsequently to be described. A pinion 330 is keyed to the shaft extension 343 adjacent to the gear 342, and meshes with an intermediate gear 340 mounted on an outboard bracket 340', indicated in dotted lines in Figure 18. The intermediate gear 340 in turn, meshes with a gear 350, secured to the shaft 281 of the roller 261, shown in Figure 21. It will thus be seen that the feed rolls 256—257 and the patch cutting cylinder 258 and its complemental roller 261, are positively driven from the shaft 343 of the cylinder 309.

To maintain accurate spacing between the peripheries of the cylinders 309 and 310, said cylinders are shown provided with rings 332 and 333, respectively, the diameters of which are slightly larger than their respective cylinders, whereby the peripheries of said rings are in rolling contact with one another, as shown in Figure 19. The rings 332 and 333 thus accurately space apart the peripheries of the cylinders, whereby the slitting or cutting of the dispensing opening in each patch is positively assured. The patch creasing and slitting cylinders 309 and 310, and their associated rolls and rollers, are driven from a cross shaft 334 having a driving connection with a shaft 335 through a suitable bevel gear drive, indicated at 336. The shaft 335 extends the length of the conveyer chains 189, and is connected to the shaft 99 by a pair of bevel gears, indicated at 337 in Figure 1.

The shaft 334, as shown in Figure 19, is mounted for relative rotation within a tubular shaft 338, shown mounted in anti-friction bearings 339 supported in the side frame members of the machine. The tubular shaft 338 has a pinion 341 secured thereto which meshes with a gear 342 secured to the end portion 343 of the shaft 344 of the cylinder 309. The gear 342, in turn, meshes with a pinion 345 adjustably mounted on an extension 346 of the shaft 347 of the cylinder 310. A collar 348 is keyed to the shaft extension 346, and has a driving connection with the pinion 345 through a lug 349 secured to the pinion 345 and received in a recess provided in the collar 348 between opposed set screws, indicated by the numeral 351 in Figure 19—A. By thus adjustably securing the pinion 345 to the shaft 346, the cylinder 310 may be rotatively adjusted relatively to the cylinder 309 to accurately aline the cutting knives 318 with the die blocks 312, provided in the peripheries of the cylinders 309 and 310. To prevent back lash or play between the teeth of the gear 342 and pinion 345, the pinion is shown provided with a small ring gear 353 mounted for rotary adjustment on the pinion 345 by suitable lock screws 354. By relatively rotating the ring gear 353 upon the pinion 345, back lash or play between the gears may be entirely eliminated.

A planetary gear device, generally indicated by the numeral 355, adjustably secures the cross shaft 334 to the tubular shaft 338, as will readily be understood by reference to Figure 19. The device 355 may be locked against relative movement, whereby the shafts 334 and 338 rotate as a unit.

A pressure roller 356 is mounted for rotation with the tubular shaft 338 and is disposed directly beneath the cylinder 309, whereby each blank with a patch applied thereto is fed between said roller 356 and the cylinder 309. The pressure roller 356 is rotatably supported in an arm 357 mounted for pivotal movement at one end on a cross shaft 358. An eccentric 359 is engaged with the opposite end of the arm 357 and is adjustable by rotation of its supporting shaft 361, whereby the spacing between the pressure roller 356 and cylinder 309 may be varied within certain limits, as will readily be understood. A suitable spring 362 constantly urges the arm 357 into contact with the eccentric 359.

A universal coupling device, generally indicated by the numeral 363 in Figure 19, drivingly connects the tubular shaft 338 with the pressure roller 356, whereby said roller is driven as a unit with the shaft 338, but is adapted for limited lateral adjustment with respect thereto. In other words, in some instances, the pressure roller 356 may be slightly eccentrically disposed with respect to the axis of the tubular shaft 338, depending upon the adjustment of the arm 357. Such eccentric relationship between the axes of the roller 356 and shaft 338 will not affect the driving engagement between these two parts.

The means for applying adhesive to each blank prior to applying a patch 232 thereto, is shown comprising an adhesive applying cylinder 364 secured to a shaft 365 mounted in suitable bearings provided in the supporting frame of the machine, as will be understood by reference to Figure 17. Suitable adhesive applying pads 366 are secured to the periphery of the cylinder 364, in diametrically opposed relation, adapted to receive adhesive from a roller 367 forming a part of a suitable adhesive applying device, generally designated by the numeral 368. The device 368, as shown in Figure 17, comprises a container 369 for the adhesive, and the periphery of the roller 367 is partially submerged in the adhesive in the container 369, whereby when the machine is in operation, it transfers adhesive to the pads 366 provided on the cylinder 364.

To support the blanks when applying the adhesive thereto, a suitable pressure roller 371 is mounted directly below the cylinder 364 and is adjustable with respect thereto by an eccentric device 372, similar to the eccentric device 359 provided for the pressure roller 356. The roller 371 is supported on a shaft 373 driven from the shaft 335 through a bevel gear drive 336, in a manner similar to the shaft 334. The cylinder 364 is driven from the shaft 373 by a pinion 374 meshing with a gear 375 secured to the shaft 365, as shown in Figure 1.

The adhesive applying pads 366 on the periphery of the cylinder 364 are adapted to apply adhesive to a predetermined area at each blank, as shown at 331 in Figure 16. The fresh adhesive thus applied to each blank is adapted to receive a patch 232, when the blank passes between the cylinder 309 and pressure roller 356, whereby the patch is firmly secured in position on the blank and in accurate registry with the dispensing closure 231 provided therein.

The peripheral speed of the cylinders 309 and 364 is the same as the traveling movement of the blanks on the conveyer chains 189. The cylinder 309 operates at a relatively faster peripheral speed than the cutting cylinder 258 and its complemental roll 261, whereby the patch may be fed between the cylinders 309 and 310 in accurately spaced relation, which is of utmost importance in order that the patches may be accurately applied to the traveling blanks.

The conveyer chains 189 are driven from the shaft 334 by a chain 381 which has a running connection with sprockets 382 and 383 provided respectively on the shafts 334 and 193, as clearly illustrated in Figure 16. As each patch 232 is pressed into contact with its respective blank 100, the conveyer chains 189 direct the blank beneath a brush 384 located above the discharge ends of the conveyer chains 189 and driven from the shaft 193 by a chain 385, shown in Figure 17.

*Blank gluing and folding machine (Figure 25)*

From the patch cutting and applying mechanism shown in Figure 17, the blanks, each with a patch applied thereto, are delivered to a blank gluing and folding machine which completes the formation of the containers or boxes. Such a gluing and folding machine is briefly illustrated in Figure 25, and is shown comprising a pair of spaced parallel belts 386 mounted on suitable pulleys 387 and 388 secured to shafts 389 and 391, respectively. The upper run 380 of the belts 386 are supported on a roller bed, indicated by the numeral 380'. A blank hold-down device, generally designated by the numeral 390, is disposed over the conveyer belts 386, adjacent to the pulleys 387, and comprises a belt 392 and a pair of longitudinally extending bars 394, which support a series of rollers which cooperate to hold the lower run of the belt 392 in feeding contact with the blanks. The belt 392 is driven from a shaft 393. A pair of blank folding belts 395 are disposed at the outer sides of the upper runs 380 of the conveyer belts 386, and inwardly fold the outer portions of the blanks, as shown at 396 and 397. Before the side portions of the blanks are inwardly folded, a suitable adhesive is applied to the marginal edge 398 of each blank.

The completely gummed and folded blanks are then delivered between suitable pressure rollers, generally indicated by the numeral 399, which feed the blanks between a pair of pressure belts 400 and 401 which direct the completed containers onto a conveyer belt 402 of a stacking mechanism, shown in Figure 26. The shafts 389 and 393 of the blank gluing and folding machine are driven from a suitable transmission 403 having a clutch pulley 404 adapted to be driven from a suitable source of power, such as a motor, not shown in the drawings. The shaft 335 is operatively connected to the transmission 403, which may constitute a part of the blank gluing and folding machine.

From the foregoing, it will thus be seen that all of the various mechanisms shown in Figure 1 are driven from the transmission 403 through the shafts 335, 99, and 34. It is to be understood that the various mechanisms may be otherwise driven, if desired, but because of the importance of accurate timing of these mechanisms, it is highly desirable that they be driven from a common source of power, in the manner shown, whereby all of the mechanisms may be accurately timed with respect to one another so that the web and blanks may be continuously fed through the machine at high speed, with the assurance that the patches 232 may be accurately positioned on the blanks, and that the completed containers will be delivered onto the stacking mechanism in the form shown in Figure 3.

*Stacking mechanism (Figure 26)*

A suitable stacking mechanism is disclosed in Figure 26, which, it will be noted, comprises the conveyer belt 402 driven from a drive pulley 405 and having its upper run supported on idler pulleys 406. A suitable belt tightener 407 is provided for maintaining the belt at the proper tension. A portion of the upper belt run is supported on a plate 408, as shown. A belt 409 is disposed over the belt 402 and has its lower run held in feeding contact with the containers by an articulated pressure bar 411, supported in a suitable frame structure, generally designated by the numeral 412. The frame structure 412 and the articulated bar 411 are mounted for pivotal movement about the axis of a drive pulley 413 secured to a shaft 414, driven by suitable means, not shown in the drawings.

The shaft 415 of the pulley 405 of the lower belt 402 is driven from the transmission 403 by a shaft 416, partially shown in Figures 1 and 16. From the stacking mechanism, shown in Figure 26, the completed containers may be delivered onto a suitable receiving means, such as a table 416.

The conveyer belt 402 of the stacking mechanism operates at a relatively slower speed than the traveling movement of the blanks through the gluing and folding machine, whereby the co-acting belts 400 of the delivery device 401 directs the completed containers onto the conveyer belt 402 in overlapping relation, as clearly illustrated in Figure 26.

The novel apparatus herein disclosed may be operated at high speed and as a result, is particularly well adapted for manufacturing containers or paper milk bottles in large quantities. All of the various mechanisms which operate on the web, and subsequently on the blanks, have rotary movements and operate continuously. This applies to both the web 3 from which the containers are made and also the strip of material 237 from which the patches 232 are made. The inverting mechanism, as hereinbefore stated, is important in that, in addition to inverting the printed blanks, it also supports the blanks in spaced relation and slowly feeds them from the drier to the patch cutting and applying mechanism, whereby the printing on the blanks may further dry before the blanks are delivered to the patch cutting and applying mechanism with the printed side down. It will also be noted that the patch cutting and applying mechanism operates continuously, when the machine is in operation, whereby the strip of patch material is continuously being fed to the cutting cylinder 258, shown in Figure 17, without interruption.

In the drawings, we have shown a complete apparatus for manufacturing paper milk bottles or containers provided with a dispensing opening, having means for closing said opening after the sealed closure has initially been broken and a portion of the contents removed from the container. The apparatus embodies mechanisms for performing all of the operations necessary to complete the formation of the containers in rapid succession from a web of paper or other suitable material, the completed cartons collapsed, as shown in Figure 3, being delivered onto the receiving table 416 ready to be paraffined or otherwise impregnated with a suitable water-proofing, which is customary with such containers, when used for liquids. The water-proofing of the containers may be done in any suitable manner, and forms no part of the present invention.

It will be apparent to those skilled in the art that we have accomplished at least the principal objects of our invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

We claim as our invention:

1. In combination with a machine of the class described comprising means for feeding preformed box blanks along a pre-determined path, a mechanism for applying a pouring spout patch to each blank, said mechanism comprising a pair of coacting feed rolls for continuously feeding a strip a patch material, a pair of severing rolls for cutting the strip material into uniform lengths or patches, a continuously rotating drum having retractable pusher fingers mounted therein adapted to engage patches delivered to the drum and feed them around the circumference of the drum in accurately spaced relation, a patch slitting roll operating in conjunction with the drum for slitting each patch to provide a dispensing opening therein, and means for guiding the preformed box blanks into engagement with the periphery of said drum, whereby a pouring spout patch is applied thereto.

2. In combination with a machine of the class described comprising means for feeding preformed blanks along a predetermined path, a mechanism for making and applying a pouring spout patch to each blank, said mechanism comprising a pair of coacting feed rolls for feeding the strip material, a pair of severing rolls for cutting the strip material into uniform patches, coacting patch spacing rolls positioned to receive the severed patches from the severing rolls to space them apart along their path of travel, a drum having retractable pusher fingers adapted to engage the patches and feed them around the circumference of the drum in accurately spaced relation, means cooperating with the periphery of the drum to provide a travel path for the patches, a patch slitting roll operating in conjunction with the drum for slitting each patch to provide a dispensing opening therein, and means for guiding the preformed blanks into engagement with the periphery of said drum whereby a pouring spout patch is applied thereto at a pre-determined location.

3. In combination with a machine for making collapsible containers from a continuously traveling web and in which the web is cut into blanks and each blank scored to form a dispensing opening provided with a closure, a mechanism for applying a pouring spout over the dispensing opening of each blank, said mechanism comprising means for feeding a strip of patch material, means for cutting the strip of patch material into uniform lengths or patches, a rotating drum having retractable pusher elements mounted therein adapted to engage the patches delivered to the drum and feed them around the circumference of the drum in accurately spaced relation, a patch slitting device operating in conjunction with the periphery of the drum for slitting each patch to provide a dispensing opening therein, and means for guiding a slitted patch into accurate registry with the dispensing opening of each container blank and securing it thereto.

4. In combination with a machine for making collapsible containers from a continuously traveling web and in which the web is cut into uniform blanks and each blank is scored to form a dispensing opening provided with a closure, a mechanism for applying a pouring spout to each blank over the dispensing opening thereof, comprising a pair of coacting feed rolls for feeding a strip of patch material, means for cutting the strip material into uniform lengths or patches, a rotating drum having a guideway partially encircling it, means for delivering the severed patches into said guideway in spaced relation, retractable pusher elements mounted in said drum adapted to engage patches delivered to the drum and feed them around the circumference of the drum in accurately spaced relation, and a patch slitting device operating in conjunction with the drum for slitting each patch without interrupting its forward movement, thereby to provide a dispensing opening therein, said guide means also serving to guide each slitted patch into accurate registry with the dispensing opening of a container blank, as the blanks are successively fed past said drum.

5. In a machine for making collapsible containers, including web feeding, blanking and gluing mechanisms and a pouring spout applying station, said station comprising means for feeding a web of pouring spout patch material, coacting rolls for transversely severing the web of patch material to provide individual patches, a rotary drum contacting directly with the container blanks made from said first mentioned web, patch guide means around a portion of the drum, patch spacing rolls for feeding the blanks from the severing rolls into said guide means in spaced relation around the circumference of the drum, a pouring spout slitting roll cooperating with means on the periphery of the drum to cut a pouring spout in each patch, and pusher elements yieldingly mounted in said drum and adapted to engage the trailing end of each patch delivered into said guide means by the spacing rolls, thereby to positively feed said patches into engagement with the slitting roll and thereafter into registered contact with the container blanks, as said blanks are fed into patch-receiving contact with said drum.

6. In a paper fabricating machine, means for feeding a first material, means for applying an adhesive to predetermined areas of said first material, means for continuously feeding a web of patch material, means moving with and severing said web of patch material into individual patches, means for creasing and slitting each patch, a feeding surface having a relatively faster speed than the speed of the patch material feeding means, said faster moving surface operating in timed relation to said first material feeding means and being arranged to receive the individual patches from the severing means and feed them into engagement with said creasing and slitting means, yieldably mounted pusher means movable simultaneously with the faster moving surface and engaging the trailing ends of said patches to positively advance them in synchronism with said faster moving surface, and means for guiding and imparting a retarding action to the patches to positively hold them against the yieldably mounted pusher means to maintain said patches in accurately spaced relation on the faster moving feeding surface, and whereby said faster moving feeding surface will combine said patches with said first material in accurate registration therein.

EDWIN G. STAUDE.
PAUL E. FISCHER.